United States Patent
Ruvio et al.

(10) Patent No.: US 11,748,474 B2
(45) Date of Patent: *Sep. 5, 2023

(54) SECURITY SYSTEM AND METHODS FOR IDENTIFICATION OF IN-VEHICLE ATTACK ORIGINATOR

(71) Applicant: Red Bend Ltd., Hod Hasharon (IL)

(72) Inventors: Guy Ruvio, ElAd (IL); Yuval Weisglass, Kfar-Saba (IL); Saar Yaacov Dickman, Zur-Moshe (IL)

(73) Assignee: Red Bend Ltd., Hod Hasharon (IL)

( * ) Notice: Subject to any disclaimer, the term of this patent is extended or adjusted under 35 U.S.C. 154(b) by 331 days.

This patent is subject to a terminal disclaimer.

(21) Appl. No.: 17/073,167

(22) Filed: Oct. 16, 2020

(65) Prior Publication Data
US 2021/0034745 A1 Feb. 4, 2021

Related U.S. Application Data

(62) Division of application No. 15/561,508, filed as application No. PCT/IL2015/050319 on Mar. 26, 2015, now Pat. No. 10,824,720.

(51) Int. Cl.
*G06F 21/85* (2013.01)
*G06F 21/55* (2013.01)
(Continued)

(52) U.S. Cl.
CPC .......... *G06F 21/554* (2013.01); *G06F 21/85* (2013.01); *H04L 63/0227* (2013.01);
(Continued)

(58) Field of Classification Search
CPC .......... H04L 2012/40215; H04L 67/12; H04L 63/1425; H04L 63/1416; H04L 63/0227;
(Continued)

(56) References Cited

U.S. PATENT DOCUMENTS 10,153,982 B2 * 12/2018 Lingadahalli .......... H04L 47/28
2005/0190619 A1   9/2005 Wakiyama
(Continued)

FOREIGN PATENT DOCUMENTS

WO   2014061021 A1   4/2014
WO   2015151566 A1   9/2016

OTHER PUBLICATIONS

ISA United States Patent and Trademark Office, International Search Report and Written Opinion Issued in Application No. PCT/IL2015/050319, dated Jul. 21, 2015, WIPO, 12 pages.
(Continued)

*Primary Examiner* — Josnel Jeudy
(74) *Attorney, Agent, or Firm* — McCoy Russell LLP

(57) ABSTRACT

The present invention provides a security system, and methods useful for vehicle CAN bus communication mapping and attack originator identification, comprising: a CAN Bus Monitor, (CBM), configured to monitor the CAN bus communication comprising one or more frames, to and/or from at least one Electronic Control Unit, (ECU); a characterization module in communication with the CBM, configured to generate at least one characteristic for the monitored communication from each the ECU and at least one characteristic for each communication frame; (c) a comparator unit in communication with the characterization module, configured to compare one or more the characteristics of at least one frame against characteristics of each the ECU communication in order to detect at least one anomaly; and, (d) one or more Identification module in communication with the comparator, configured to identify at least one ECU originating an attack on the CAN bus.

26 Claims, 6 Drawing Sheets

(51) Int. Cl.
*H04L 9/40* (2022.01)
*H04W 12/122* (2021.01)
*H04W 12/126* (2021.01)
*H04W 12/128* (2021.01)
*H04W 4/48* (2018.01)
*H04L 67/12* (2022.01)
*H04L 12/40* (2006.01)

(52) U.S. Cl.
CPC ...... *H04L 63/1416* (2013.01); *H04L 63/1425* (2013.01); *H04W 12/122* (2021.01); *H04W 12/126* (2021.01); *H04W 12/128* (2021.01); *H04L 67/12* (2013.01); *H04L 2012/40215* (2013.01); *H04W 4/48* (2018.02)

(58) Field of Classification Search
CPC ... H04W 4/48; H04W 12/122; H04W 12/128; H04W 12/126; G06F 21/85; G06F 21/554
USPC .......................................................... 726/23
See application file for complete search history.

(56) References Cited

U.S. PATENT DOCUMENTS

| | | |
|---|---|---|
| 2013/0054050 A1 | 2/2013 | Filev et al. |
| 2013/0213344 A1 | 8/2013 | Stender |
| 2013/0227648 A1 | 8/2013 | Ricci |
| 2013/0339721 A1 | 12/2013 | Yasuda |
| 2014/0032800 A1 | 1/2014 | Peirce et al. |
| 2014/0247122 A1 | 9/2014 | Moeller et al. |
| 2015/0066239 A1 | 3/2015 | Mabuchi |
| 2015/0242180 A1* | 8/2015 | Boulanger-Lewandowski ............ G06N 3/0445 700/94 |
| 2016/0197944 A1 | 7/2016 | Allouche et al. |
| 2018/0196941 A1 | 7/2018 | Ruvio et al. |
| 2021/0194932 A1* | 6/2021 | Hill .................... H04L 63/0876 |

OTHER PUBLICATIONS

International Bureau of WIPO, International Preliminary Reporton Patentability Issued in Application No. PCT/IL2015/050319, dated Oct. 5, 2017, WIPO, 12 pages.
European Patent Office, Supplementary Extended European Search Report Issued in Application No. 15886169.0, dated Nov. 6, 2018, Germany, 8 pages.
United State Patent and Trademark Office, Restriction Requirement Issued in U.S. Appl. No. 15/561,508, dated Jan. 28, 2019, 5 pages.
United State Patent and Trademark Office, Office Action Issued in U.S. Appl. No. 15/561,508, dated Apr. 5, 2019, 16 pages.
United State Patent and Trademark Office, Office Action Issued in U.S. Appl. No. 15/561,508, dated Oct. 18, 2019, 14 pages.
United State Patent and Trademark Office, Office Action Issued in U.S. Appl. No. 15/561,508, dated Jan. 22, 2020, 19 pages.
European Patent Office, Communication pursuant to Article 94(3) EPC Issued in Application No. 15886169.0, dated Mar. 18, 2020, Germany, 4 pages.

* cited by examiner

SECURITY SYSTEM AND METHODS FOR IDENTIFICATION OF IN-VEHICLE ATTACK ORIGINATOR

CROSS-REFERENCE TO RELATED APPLICATIONS

The present application is a divisional of U.S. National Phase Patent application Ser. No. 15/561,508, entitled "SECURITY SYSTEM AND METHODS FOR IDENTIFICATION OF IN-VEHICLE ATTACK ORGINATOR", and filed on Sep. 25, 2017. U.S. patent application Ser. No. 15/561,508 is the National Stage filing of International Patent Application No. PCT/IL15/50319, entitled "SECURITY SYSTEM AND METHODS FOR IDENTIFICATION OF IN-VEHICLE ATTACK ORIGNATOR," and filed on Mar. 26, 2015. The entire contents of the above-listed applications are hereby incorporated by reference for all purposes.

FIELD OF THE INVENTION

The present invention relates to security systems and methods in general and in particular to protecting in vehicle systems from cyber-attacks by identifying an attack originator.

BACKGROUND OF THE INVENTION

Electronic systems are increasingly incorporated as essential parts of a vehicle. These systems are configured to control and/or monitor almost every aspect of vehicle operations. Possible applications range from engine operations, driving assistance modules, steering control, door opening and locking, speed sensors, light control, safety mechanisms (e.g. ABS brakes, air bags and etc.), and others as known in the art. Having most of today's vehicles controlled and monitored by electronic systems, makes them vulnerable to attacks from the outside, allowing deep intervention in the driving behavior of the vehicle. Although current vehicle communication systems are configured to cope with various technical difficulties, they are mostly unsecure against malicious attacks. Further, connecting external communication systems to the vehicle, such as mobile communication, and multimedia networks increase the vulnerability and susceptibility of the vehicle systems to attacks from the outside.

The vehicle electronic systems are usually connected in a BUS configuration comprising nodes, and are interacting there between to perform their function in a predetermined coordinated manner. This communication is based on nodes sending messages to other nodes connected to the same BUS.

Many typical characteristics of current automotive bus systems enable unauthorized access relatively easy. For example, most communication between controllers is done unencrypted, in plain text. Another vulnerability in entailed in the fact that almost all possible bus messages, their respective structures and communication protocols are specified in publically available documents. Another predicament is that controllers are not able to verify if an incoming message comes from an authorized sender.

In vehicle electronic systems a spoofed message can appear authentic by imitating the structure, signature, and/or content of an authentic message, although sent from a different source. One of the inherent properties of a Controller Area Network (CAN) bus is the lack of source identification. A node on the BUS receiving a message has no ability to verify the message source without applying proprietary authentication techniques. Traditional signature-based intrusion detection systems are based on signatures of known attacks and cannot detect emerging cyber threats. Further substantial latency in deployment of newly created signatures across the computer systems significantly limits the attack detection.

Known in the art are several bus security solutions. One example is WO 2013/144962 A1 titled: "SECURITY SYSTEM AND PROTECTING A VEHICLE ELECTRONIC SYSTEM", discloses a security system for a vehicle electronic system by selectively intervening in the communications path in order to prevent the arrival of malicious messages at ECUs, in particular at the safety critical ECUs. The security system includes a filter which prevents illegal messages sent by any system or device communicating over a vehicle communications bus from reaching their destination, and the option of setting a rating of suspicious messages transferred through. Further the system discloses the filtering of a message according to message ID, message data field, message length, and according to the port the message was received. However, this application does not provide means for detection of malicious frames and detection of an attack originator no means other than the physical connection port to the bus are mentioned to identify the message source, nor analyzing the bus communication architecture.

Another example is US 2011/0093639, titled "secure communications between and verification of authorized CAN devices", disclosing an approach of utilizing encryption for the process of authentication. However this approach depends on external computer systems and utilizes many system resources, and does not disclose means of detecting an attack originator.

Knowledge as to the mapping of a CAN bus network enables rapid diagnosis of an attack originator and allows means for detecting the attack originator. A few technics for mapping a CAN bus network are known in the art. Typically, a process of researching a new vehicle communication system requires at least one of the following methods known in the art to identify which frame is sent by which ECU in order to create a sort of a CAN-matrix (provided that this information was not available in advance). Some of the more conventional techniques involve:

analyzing the signals conveyed in different frames to evaluate their purpose;

using network management commands to shut off parts of the network in order to match frames to physical ECUs;

physically separating ECUs from the network to isolate frames that originate from that ECU;

reverse engineering the ECU code to come up with the list of frames that the given ECU can send; and, depending on prior knowledge of the physical location of the ECUs inside a vehicle is known then electrical measurements can identify the source transceiver/ECU distance from the measuring tool location.

However, all of the above examples require a lot of time and/or effort, and may require initial knowledge about the network architecture, number of ECUs, proprietary commands and so on.

None of the prior art examples disclose means of identifying an attack originator by specific characteristics, or any means of mapping the architecture and/or logic of the specific bus communication system thereby providing rapid identification of an attack originator.

Since it is crucial to identifying both the actual frames that construct the attack and the source of the attack, there is a long felt need for tools enabling the identification of the network architecture malicious communication source, and malicious frames for providing security, in a cost effective, efficient manner to automotive bus communication systems.

SUMMARY OF THE INVENTION

The present invention provides a security system, useful for vehicle CAN bus communication attack originator identification, comprising: (a) one or more CAN Bus Monitor(s), (CBM), configured to monitor the CAN bus communication comprising one or more frames, to and/or from at least one Electronic Control Unit, (ECU); (b) one or more Characterization module(s) in communication with the CBM, configured to generate at least one characteristic for the monitored communication from each the ECU and at least one characteristic for each communication frame; (c) one or more Comparator unit(s) in communication with the characterization module, configured to compare one or more the characteristics of at least one frame against characteristics of each the ECU communication in order to detect at least one anomaly; and, (d) one or more Identification module(s) in communication with the Comparator, configured to identify at least one ECU originating an attack on the CAN bus; wherein the Comparator unit is configured to generate at least one event for at least one detected anomaly comprising at least one characteristic difference and forward the event to the identification module configured to identify at least one ECU originating the attack according to the characteristic difference.

It is another object of the present invention to disclose the system as described in any of the above, wherein one or more of the ECU is selected from: (a) an On-board ECU installed during a vehicle manufacturing process; (b) an ECU installed post vehicle assembly by a manufacturer; (c) an ECU physically added to the CAN BUS by an attacker; and, (d) any combination thereof.

It is another object of the present invention to disclose the system as described in any of the above, wherein the ECU is at least one of: (a) engine management ECU; (b) transmission management ECU; (c) safety related ECU; (d) telematics control unit (TCU); (e) brake control ECU; (f) central timing module (CTM) ECU; (g) passenger comfort related ECU; (h) human-machine interface (HMI) ECU; (i) battery management ECU; (j) driver assistance ECU; (k) chassis electronics ECU; (l) infotainment ECU; and, (m) any combination thereof.

It is another object of the present invention to disclose the system as described in any of the above, wherein the characterization module is configured to receive the monitored communication from more than one CAN bus monitor.

It is another object of the present invention to disclose the system as described in any of the above, wherein the system further comprises at least one message database operatively in communication with at least the characterization module, the message database configured to store at least one monitored frame and one or more characteristic of the frame and/or the ECU communication provided by the characterization module.

It is another object of the present invention to disclose the system as described in any of the above, wherein the message database is operatively in communication with the comparator configured to receive at least one characteristic for comparing to at least one monitored frame.

It is another object of the present invention to disclose the system as described in any of the above, wherein the characterization module is configured to generate at least one characteristic selected from: (a) time based characteristic; (b) electrical based characteristic; (c) noise based characteristic; (d) physical CAN bus characteristic; and, (e) any combination thereof;

It is another object of the present invention to disclose the system as described in any of the above, wherein the characterization module is further configured to evaluate time based characteristics selected from: (a) timing between consecutive frames; (b) timing between a frame and the last similar frame; (c) timing between predefined frame patterns; (d) timing between detected frame patterns; (e) sequence in which frames are transmitted; (f) timing distribution within frame patterns; (g) timing between different frame types; (h) timing between same frame types; (i) timing between inter-frame spaces; and, (j) any combination thereof.

It is another object of the present invention to disclose the system as described in any of the above, wherein at least one evaluated frame originates from at least one of: (a) the ECU, (b) at least one first the frame originates from the ECU and at least a second the frame originates from at least a second ECU; and, (c) any combination thereof.

It is another object of the present invention to disclose the system as described in any of the above, wherein the Comparator compares against one or more the characteristics selected from: (a) learned over time; (b) predefined; (c) updated in real-time; (d) updated remotely; and, (e) any combination thereof.

It is another object of the present invention to disclose the system as described in any of the above, wherein the identification module is further configured to forward at least one event and/or the identified attack originator to at least one selected from: (a) a driver of a vehicle comprising at least a portion of the CAN bus by means of a dedicated human machine interface; (b) one or more the ECU; (c) one or more third party system located in the vehicle comprising at least a portion of the CAN bus; (d) one or more external system; and, (e) any combination thereof.

It is another object of the present invention to disclose the system as described in any of the above, wherein the system further comprises at least one mapping module operatively in communication with at least the characterization module and the bus communication, the mapping module comprising: (a) a sending unit configured to send one or more input frames in order to induce at least one response frame; and, (b) at least one mapping database comprising monitored response frame characteristics of each the responding ECU and/or frame relation characteristics generated by the characterization module between at least one sent frame and one or more the response frame; further wherein the mapping module is configured to actively send one or more frames in order to induce at least one response frame; the monitored response frame characterized by the characterization module for generating at least one characteristic of the response frame originating ECU and/or at least one relation characteristics between at least one sent frame and one or more the response frame.

It is another object of the present invention to disclose the system as described in any of the above, wherein the relation characteristic comprises at least one of: (a) timing between sending at least one frame and receiving at least one response frame; (b) type(s) of the response frame received and the type(s) of the sent frame; (c) number of the sent frames in order to receive at least one response frame; (d) number of the response frames received in following at least one sent frame; (e) the response frame and the sent frame content; (f) sequence of the response frames following at least one sent frame; (g) sequence of the sent frames in order to receive at least one response frame; (h) the sent frame and the response frame at least one characteristic selected from: time based characteristic, electrical based characteristic, physical CAN BUS based characteristic; (i) the sent frame and the response frame one or more time evaluated characteristic selected from: (i) timing between consecutive frames; (ii) timing between a frame and a last similar frame; (iii) timing between predefined frame patterns; (iv) timing between learned patterns; (v) sequence in which frames are transmitted; and, (j) any combination thereof.

It is another object of the present invention to disclose the system as described in any of the above, wherein the mapping module is configured to log in the mapping database at least one of: one or more the relation characteristic between at least one sent frame and at least one response frame, response frames, the response frames characteristics, the response frames originating ECU characteristics, and any combination thereof.

It is another object of the present invention to disclose the system as described in any of the above, wherein the mapping module is configured to generate at least one probability matrix of possible the response frames and/or the response frames characteristics and/or the frame relation characteristics for at least one sent frame according to the mapping database.

It is another object of the present invention to disclose the system as described in any of the above, wherein one or more of the comparator unit(s) is configured to perform at least one of: (a) compare one or more the characteristics of at least one monitored frame, against one or more the probability matrix provided characteristic; (b) compare at least one relation characteristics between at least one first frame and at least one second frame against one or more the probability matrix provided relation characteristic; and, (c) any combination thereof; in order to detect at least one anomaly.

It is another object of the present invention to disclose the system as described in any of the above, wherein the comparator unit is further operatively in communication with the mapping module; further wherein the comparator is configured to compare the one or more the characteristic of at least one frame to at least one characteristic of a selected from: (a) at least one response frame previously induced by the mapping module; (b) at least one response frame logged in the mapping database as being induced by a similar frame as the compared frame; (c) at least one sent frame and one response frame logged in the mapping database when the sent frame is similar to the compared message frame; (d) at least one monitored frame not induced by the mapping module; (e) at least one characteristic selected from: time based characteristic, electrical based characteristic, noise based characteristic, physical CAN bus characteristic; and, any combination thereof, from the mapping database; and, (f) any combination thereof; in order to detect at least one anomaly.

It is another object of the present invention to disclose the system as described in any of the above, wherein the mapping module is configured to send at least one frame selected from: (a) monitored communication frame, (b) modified communication frame; (c) predefined communication frame; (d) error communication frame; (e) data communication frame; (f) overload communication frame; (g) remote communication frame; and, (h) any combination thereof, in order to induce at least one response frame.

The present invention provides a method for vehicle CAN bus communication attack originator identification, comprising the steps of: (a) providing: (i) one or more CAN Bus Monitor(s), (CBM), configured to monitor the CAN bus communication comprising one or more frames, to and/or from at least one Electronic Control Unit, (ECU); (ii) one or more Characterization module(s) in communication with the CBM, configured to generate at least one characteristic for the monitored communication for each the ECU and at least one characteristic for each communication frame; (iii) one or more Comparator unit(s) in communication with the characterization module, configured to compare one or more the characteristics of at least one frame against characteristics of each the ECU communication in order to detect at least one anomaly; and, (iv) one or more Identification module(s) in communication with the Comparator, configured to identify at least one ECU originating an attack on the CAN bus; (b) monitoring the CAN bus communication to and from at least one ECU by means of the monitoring unit; (c) providing at least one characteristics of the monitored communication by means of the Characterization module; (d) comparing at least one characteristics of at least one frame by means of the comparator against at least one ECU characteristics in order to detect at least one anomaly; (e) identifying at least one ECU by means of the identification module, originating an attack on the CAN bus; wherein the step (d) of comparing at least one characteristic by the comparator additionally comprising generating at least one event for at least one detected anomaly comprising at least one characteristic difference and forwarding the event to the identification module configured to identify at least one ECU originating the attack according to the characteristic difference.

It is another object of the present invention to disclose the method as described in any of the above, additionally comprising the step of providing one or more of the ECU from: (a) an On-board ECU installed during a vehicle manufacturing process; (b) an ECU installed post vehicle assembly by a manufacturer; (c) an ECU physically added to the CAN BUS by an attacker; and, (d) any combination thereof.

It is another object of the present invention to disclose the method as described in any of the above, additionally comprising the step of providing one or more of the ECU selected from (a) engine management ECU; (b) transmission management ECU; (c) safety related ECU; (d) telematics control unit (TCU); (e) brake control ECU; (f) central timing module (CTM) ECU; (g) passenger comfort related ECU; (h) human-machine interface (HMI) ECU; (i) battery management ECU; (j) driver assistance ECU; (k) chassis electronics ECU; (l) infotainment ECU; and, (m) any combination thereof.

It is another object of the present invention to disclose the method as described in any of the above, additionally comprising the step of providing the characterization module configured to receiving monitored traffic from more than one CAN bus Monitor.

It is another object of the present invention to disclose the method as described in any of the above, additionally comprising the steps of: (a) providing the system further comprising at least one message database operatively in communication with at least the characterization module; and, (b) storing by means of the message database at least one monitored frame and one or more characteristic of the frame and/or the ECU communication provided by the characterization module.

It is another object of the present invention to disclose the method as described in any of the above, additionally comprising the steps of: (a) providing the message database operatively in communication with the comparator configured to receive at least one characteristic from the database;

and, (b) receiving by means of the comparator at least one characteristic from the database and comparing the characteristic to at least one monitored message characteristic.

It is another object of the present invention to disclose the method as described in any of the above, additionally comprising the step of the characterization module generating at least one characteristic selected from: (a) time based characteristic; (b) electrical based characteristic; (c) noise based characteristic; (d) physical CAN bus characteristic; and, (e) any combination thereof;

It is another object of the present invention to disclose the method as described in any of the above, additionally comprising the step of the characterization module evaluating time based characteristics selected from: (a) timing between consecutive frames; (b) timing between a frame and the last similar frame; (c) timing between predefined frame patterns; (d) timing between detected frame patterns; (e) sequence in which frames are transmitted; (f) timing distribution within frame patterns; (g) timing between different frame types; (h) timing between same frame types; (i) timing between interframe spaces; and, (j) any combination thereof.

It is another object of the present invention to disclose the method as described in any of the above, additionally comprising the step of selecting at least one evaluated frame originating from at least one of: (a) the ECU; (b) at least one first the frame originates from the ECU and at least a second the frame originates from at least a second ECU; and, (c) any combination thereof.

It is another object of the present invention to disclose the method as described in any of the above, additionally comprising the step of comparing by means of the Comparator against one or more the characteristics selected from: (a) learned over time; (b) predefined; (c) updated in realtime; (d) updated remotely; and, (e) any combination thereof.

It is another object of the present invention to disclose the method as described in any of the above, additionally comprising the step of the identification module forwarding at least one event and/or the identified attack originator to at least one selected from: (a) a driver of a vehicle comprising at least a portion of the CAN bus by means of a dedicated human machine interface; (b) one or more the ECU; (c) one or more third party system located in the vehicle comprising at least a portion of the CAN bus; (d) one or more external system; and, (e) any combination thereof.

It is another object of the present invention to disclose the method as described in any of the above, additionally comprising the steps of: (a) providing the system further comprising at least one mapping module operatively in communication with at least the characterization module and the bus communication, the mapping module comprising: (i) a sending unit configured to send one or more input frames in order to induce at least one response frame; and, (ii) at least one mapping database comprising monitored response frame characteristics of each the responding ECU and/or frame relation characteristics generated by the characterization module between at least one sent frame and one or more the response frame; (b) the mapping module actively sending one or more frames for inducing at least one response frame; and, (c) the characterization module characterizing the monitored response frame for generating at least one characteristic of the response frame originating ECU and/or at least one relation characteristics between at least one sent frame and one or more the response frame.

It is another object of the present invention to disclose the method as described in any of the above, wherein the relation characteristic comprising at least one of: (a) timing between sending at least one frame and receiving at least one response frame; (b) type(s) of the response frame received and the type(s) of the sent frame; (c) number of the sent frames in order to receive at least one response frame; (d) number of the response frames received in following at least one sent frame; (e) the response frame and the sent frame content; (f) sequence of the response frames following at least one sent frame; (g) sequence of the sent frames in order to receive at least one response frame; (h) the sent frame and the response frame at least one characteristic selected from: time based characteristic, electrical based characteristic, physical CAN BUS based characteristic; (i) the sent frame and the response frame one or more time evaluated characteristic selected from: (i) timing between consecutive frames; (ii) timing between a frame and a last similar frame; (iii) timing between predefined frame patterns; (iv) timing between learned patterns; (v) sequence in which frames are transmitted; and, (j) any combination thereof.

It is another object of the present invention to disclose the method as described in any of the above, additionally comprising the step of the mapping module logging into the mapping database at least one of: one or more the relation characteristic between at least one sent frame and at least one response frame, response frames, the response frames characteristics, the response frames originating ECU characteristics, and any combination thereof.

It is another object of the present invention to disclose the method as described in any of the above, additionally comprising the step of generating by means of the mapping module at least one probability matrix of possible the response frames and/or the response frames characteristics and/or the frame relation characteristics for at least one sent frame according to the mapping database.

It is another object of the present invention to disclose the method as described in any of the above, additionally comprising the steps of performing by means of one or more of the comparator unit(s) at least one of: (a) comparing one or more the characteristics of at least one monitored frame, against one or more the probability matrix provided characteristic; (b) comparing at least one relation characteristics between at least one first frame and at least one second frame against one or more the probability matrix provided relation characteristic; and, (c) any combination thereof; in order to detect at least one anomaly.

It is another object of the present invention to disclose the method as described in any of the above, additionally comprising the steps of: (a) the comparator unit is further operatively communicating with the mapping module; and, (b) comparing by means of the comparator one or more the characteristic of at least one frame to at least one characteristic of a selected from: (i) at least one response frame previously induced by the mapping module; (ii) at least one response frame logged in the mapping database as being induced by a similar frame as the compared frame; (iii) at least one sent frame and one response frame logged in the mapping database when the sent frame is similar to the compared message frame; (iv) at least one monitored frame not induced by the mapping module; (v) at least one characteristic selected from: time based characteristic, electrical based characteristic, noise based characteristic, physical CAN bus characteristic; and, any combination thereof, from the mapping database; and, (vi) any combination thereof; in order to detect at least one anomaly.

It is another object of the present invention to disclose the method as described in any of the above, additionally comprising the step of the mapping module sending messages selected from: (a) monitored communication frame;

(b) modified communication frame; (c) predefined communication frame; (d) error communication frame; (e) data communication frame; (f) overload communication frame; (g) remote communication frame; and, (h) any combination thereof, in order to induce response frames.

The present invention provides a vehicle CAN bus network mapping system, comprising: (a) one or more CAN Bus Monitor(s), (CBM), configured to monitor the CAN bus communication comprising one or more frames to and/or from at least one Electronic Control Unit, (ECU); (b) at least one sending unit configured to send frames into the CAN bus network for inducing at least one response frame; (c) one or more Characterization module(s) in communication with the CBM, configured to provide and at least one characteristic for each the ECU monitored communication and/or frame relation characteristics generated by the characterization module between at least one sent frame and one or more the response frame; (d) one or more mapping database operatively in communication with the sending unit and the characterization module; the mapping database comprising monitored response frame characteristics of each the responding ECU and/or frame relation characteristics, generated by the characterization module between at least one sent frame and one or more the response frame; (e) at least one processor in communication with a non-transient computer readable medium (CRM); the processor executes a set of operations received from the CRM; the set of operations are: (i) sending at least one frame by means of the sending unit in order to induce at least one response frame; (ii) monitoring the CAN bus communication by means of the CBM; (iii) characterizing at least one response frame, and/or the relation between the sent frame and the response frame by means of the characterization module and generating; and, (iv) logging the sent frame, one or more the response frame characteristic and/or one or more relation characteristics between the sent frame and at least one response frame into the mapping database; wherein the processor is configured to generate one or more probability matrix comprising at least one of: possible response frames, possible response frames characteristics, possible characteristics of each ECU originating communication, possible relation characteristics, and any combination thereof, for at least one sent frame according to the mapping database.

It is another object of the present invention to disclose the system as described in any of the above, wherein one or more of the ECU is selected from: (a) an On-board ECU installed during a vehicle manufacturing process; (b) an ECU installed post vehicle assembly by a manufacturer; (c) an ECU physically added to the CAN BUS by an attacker; and, (d) any combination thereof.

It is another object of the present invention to disclose the system as described in any of the above, wherein the ECU is at least one of: (a) engine management ECU; (b) transmission management ECU; (c) safety related ECU; (d) telematics control unit (TCU); (e) brake control ECU; (f) central timing module (CTM) ECU; (g) passenger comfort related ECU; (h) human-machine interface (HMI) ECU; (i) battery management ECU; (j) driver assistance ECU; (k) chassis electronics ECU; (l) infotainment ECU; and, (m) any combination thereof.

It is another object of the present invention to disclose the system as described in any of the above, wherein the characterization module is configured to receive monitored communication from more than one CBM.

It is another object of the present invention to disclose the system as described in any of the above, wherein the characterization module is configured to generate at least one frame characteristic selected from: (a) time based characteristic; (b) electrical based characteristic; (c) noise based characteristic; (d) physical CAN bus characteristic; and, (e) any combination thereof.

It is another object of the present invention to disclose the system as described in any of the above, wherein the characterization module is further configured to evaluate time based characteristics selected from: (a) timing between consecutive frames; (b) timing between a frame and the last similar frame; (c) timing between predefined frame patterns; (d) timing between detected frame patterns; (e) sequence in which frames are transmitted; (f) timing distribution within frame patterns; (g) timing between different frame types; (h) timing between same frame types; (i) timing between inter-frame spaces; and, (j) any combination thereof.

It is another object of the present invention to disclose the system as described in any of the above, wherein at least one evaluated frame originates from at least one of: (a) the ECU; (b) at least one first the frame originates from the ECU and at least a second the frame originates from at least a second ECU; and, (c) any combination thereof.

It is another object of the present invention to disclose the system as described in any of the above, wherein the relation characteristic comprises at least one of: (a) timing between sending at least one frame and receiving at least one response frame; (b) type(s) of the response frame received and the type(s) of the sent frame; (c) number of the sent frames in order to receive at least one response frame; (d) number of the response frames received in following at least one sent frame; (e) the response frame and the sent frame content; (f) sequence of the response frames following at least one sent frame; (g) sequence of the sent frames in order to receive at least one response frame; (h) the sent frame and the response frame at least one characteristic selected from: time based characteristic, electrical based characteristic, physical CAN BUS based characteristic; (i) the sent frame and the response frame one or more time evaluated characteristic selected from: (i) timing between consecutive frames; (ii) timing between a frame and a last similar frame; (iii) timing between predefined frame patterns; (iv) timing between learned patterns; (v) sequence in which frames are transmitted; and, (j) any combination thereof.

It is another object of the present invention to disclose the system as described in any of the above, wherein the system further comprises one or more comparator unit(s) in communication with the characterization module and the mapping database, and one or more Identification module(s) in communication with the comparator unit, the comparator is configured to perform at least one of: (a) compare one or more the characteristics of at least one monitored frame, against at least one of: (i) one or more the characteristics of at least one response frame; (ii) one or more the ECU originating communication characteristic; and, (iii) one or more the probability matrix provided characteristic; (b) compare at least one relation characteristics between at least one first frame and at least one second frame against: (i) one or more relation characteristic between at least one sent frame and at least one response frame; and, (ii) one or more the probability matrix provided relation characteristic; and, (c) any combination thereof; in order to detect at least one anomaly; the identification module is configured to receive at least one anomaly from the comparator unit and identify at least one ECU originating the attack according to the characteristic difference.

It is another object of the present invention to disclose the system as described in any of the above, wherein the comparator is configured to compare the one or more the characteristic of at least one frame to at least one characteristic of a selected from: (a) at least one response frame induced by the mapping module; (b) at least one response frame logged in the mapping database as being induced by a similar frame as the compared frame; (c) at least one sent frame and one response frame logged in the mapping database when the sent frame is similar to the compared message frame; (d) at least one monitored frame not induced by the mapping module; and, (e) any combination thereof; in order to detect at least one anomaly.

It is another object of the present invention to disclose the system as described in any of the above, wherein the comparator compares against one or more the characteristics selected from: (a) learned over time; (b) predefined; (c) updated in real-time; (d) updated remotely; and, (e) any combination thereof.

It is another object of the present invention to disclose the system as described in any of the above, wherein the identification module is further configured to forward at least one event and/or the identified attack originator to at least one selected from: (a) a driver of a vehicle comprising at least a portion of the CAN bus by means of a dedicated human machine interface; (b) one or more the ECU; (c) one or more third party system located in the vehicle comprising at least a portion of the CAN bus; (d) one or more external system; and, (e) any combination thereof.

It is another object of the present invention to disclose the system as described in any of the above, wherein the sending module is configured to send at least one frame selected from: (a) monitored communication frame; (b) modified communication frame; (c) predefined communication frame; (d) error communication frame; (e) data communication frame; (f) overload communication frame; (g) remote communication frame; and, (h) any combination thereof, in order to induce at least one response frame.

The present invention provides a method for mapping a vehicle CAN bus network, comprising the steps of: (a) providing (i) one or more CAN Bus Monitor(s), (CBM), configured to monitor the CAN bus communication comprising one or more frames to and/or from at least one Electronic Control Unit, (ECU); (ii) at least one sending unit configured to send frames into the CAN bus network for inducing at least one response frame; (iii) one or more Characterization module(s) in communication with the CBM, configured to provide and at least one characteristic for each the ECU monitored communication and/or frame relation characteristics generated by the characterization module between at least one sent frame and one or more the response frame; (iv) at least one mapping module comprising a mapping database, operatively in communication with the sending unit and the characterization module; the mapping database comprising monitored response frame characteristics of each the responding ECU and/or frame relation characteristics, generated by the characterization module between at least one sent frame and one or more the response frame; (b) sending at least one frame by means of the sending unit; (c) monitoring the CAN bus communication by means of the CBM; (d) characterizing at least one response frame, and/or the relation between the sent frame and the response frame by means of the characterization module; and, (e) logging the sent frame, one or more the response frame characteristic and/or one or more relation characteristics between the sent frame and at least one response frame into the mapping; wherein the method additionally comprises the step of generating at least one probability matrix of possible response frames and/or the response characteristics by means of the mapping module for at least one sent frame according to the mapping database.

It is another object of the present invention to disclose the method as described in any of the above, additionally comprising the step of providing the ECU from at least one of: (a) an On-board ECU installed during a vehicle manufacturing process; (b) an ECU installed post vehicle assembly by a manufacturer; (c) an ECU physically added to the CAN BUS by an attacker; and, (d) any combination thereof.

It is another object of the present invention to disclose the method as described in any of the above, additionally comprising the step of providing the ECU from at least one of: (a) engine management ECU; (b) transmission management ECU; (c) safety related ECU; (d) telematics control unit (TCU); (e) brake control ECU; (f) central timing module (CTM) ECU; (g) passenger comfort related ECU; (h) human-machine interface (HMI) ECU; (i) battery management ECU; (j) driver assistance ECU; (k) chassis electronics ECU; (l) infotainment ECU; and, (m) any combination thereof.

It is another object of the present invention to disclose the method as described in any of the above, additionally comprising the step of the characterization module receiving the monitored communication from more than one CBM.

It is another object of the present invention to disclose the method as described in any of the above, additionally comprising the step of the generating by means of the characterization module at least one frame characteristic selected from: (a) time based characteristic; (b) electrical based characteristic; (c) noise based characteristic; (d) physical CAN bus characteristic; and, (e) any combination thereof.

It is another object of the present invention to disclose the method as described in any of the above, additionally comprising the step of evaluating by means of the characterization module, time based characteristics selected from: (a) timing between consecutive frames; (b) timing between a frame and the last similar frame; (c) timing between predefined frame patterns; (d) timing between detected frame patterns; (e) sequence in which frames are transmitted; (f) timing distribution within frame patterns; (g) timing between different frame types; (h) timing between same frame types; (i) timing between interframe spaces; and, (j) any combination thereof.

It is another object of the present invention to disclose the method as described in any of the above, wherein at least one evaluated frame originates from at least one of: (a) the ECU; (b) at least one first the frame originates from the ECU and at least a second the frame originates from at least a second ECU; and, (c) any combination thereof.

It is another object of the present invention to disclose the method as described in any of the above, wherein the relation characteristic comprising at least one of: (a) timing between sending at least one frame and receiving at least one response frame; (b) type(s) of the response frame received and the type(s) of the sent frame; (c) number of the sent frames in order to receive at least one response frame; (d) number of the response frames received in following at least one sent frame; (e) the response frame and the sent frame content; (f) sequence of the response frames following at least one sent frame; (g) sequence of the sent frames in order to receive at least one response frame; (h) the sent frame and the response frame at least one characteristic selected from: time based characteristic, electrical based characteristic, physical CAN BUS based characteristic; (i) the sent frame and the response frame one or more time evaluated characteristic selected from: (i) timing between consecutive frames; (ii) timing between a frame and a last similar frame; (iii) timing between predefined frame patterns; (iv) timing between learned patterns; (v) sequence in which frames are transmitted; and, (j) any combination thereof.

It is another object of the present invention to disclose the method as described in any of the above, additionally comprising the steps of: (a) providing the system further comprising one or more comparator unit(s) in communication with the characterization module and the mapping database, and one or more Identification module(s) in communication with the comparator unit; (b) preforming at least one of: (i) comparing one or more the characteristics of at least one monitored frame, against at least one of: (1) one or more the characteristics of at least one response frame; (2) one or more the ECU originating communication characteristic; and, (3) one or more the probability matrix provided characteristic; and, (ii) comparing at least one relation characteristics between at least one first frame and at least one second frame against: (1) one or more relation characteristic between at least one sent frame and at least one response frame; and, (2) one or more the probability matrix provided relation characteristic; and, (iii) any combination thereof; for detecting at least one anomaly, and, (b) receiving by means of the identification module at least one anomaly from the comparator unit and identify at least one ECU originating the attack according to the characteristic difference.

It is another object of the present invention to disclose the method as described in any of the above, additionally comprising the step of providing comparing by means of the comparator one or more the characteristic of at least one frame to at least one characteristic of a selected from: (a) at least one response frame induced by the mapping module; (b) at least one response frame logged in the mapping database as being induced by a similar frame as the compared frame; (c) at least one sent frame and one response frame logged in the mapping database when the sent frame is similar to the compared message frame; (d) at least one monitored frame not induced by the mapping module; and, (e) any combination thereof; in order to detect at least one anomaly.

It is another object of the present invention to disclose the method as described in any of the above, additionally comprising the step of comparing by means of the comparator against one or more the characteristics selected from: (a) learned over time; (b) predefined; (c) updated in real-time; (d) updated remotely; and, (e) any combination thereof.

It is another object of the present invention to disclose the method as described in any of the above, additionally comprising the step of the identification module forwarding at least one anomaly and/or the identified attack originator to at least one selected from: (a) a driver of a vehicle comprising at least a portion of the CAN bus by means of a dedicated human machine interface; (b) one or more the ECU; (c) one or more third party system located in the vehicle comprising at least a portion of the CAN bus; (d) one or more external system; and, (e) any combination thereof.

It is another object of the present invention to disclose the method as described in any of the above, additionally comprising the step of sending by means of the sending module at least one frame selected from: (a) monitored communication frame, (b) modified communication frame; (c) predefined communication frame; (d) error communication frame; (e) data communication frame; (f) overload communication frame; (g) remote communication frame; and, (h) any combination thereof; in order to induce at least one response frame.

BRIEF DESCRIPTION OF THE FIGURES

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The present invention may be practiced according to the claims without some or all of these specific details. For the purpose of clarity, technical material that is known in the technical fields related to the invention has not been described in detail so that the present invention is not unnecessarily obscured. In the accompanying drawing:

DETAILED DESCRIPTION OF THE PREFERRED EMBODIMENTS

Figure 1A:
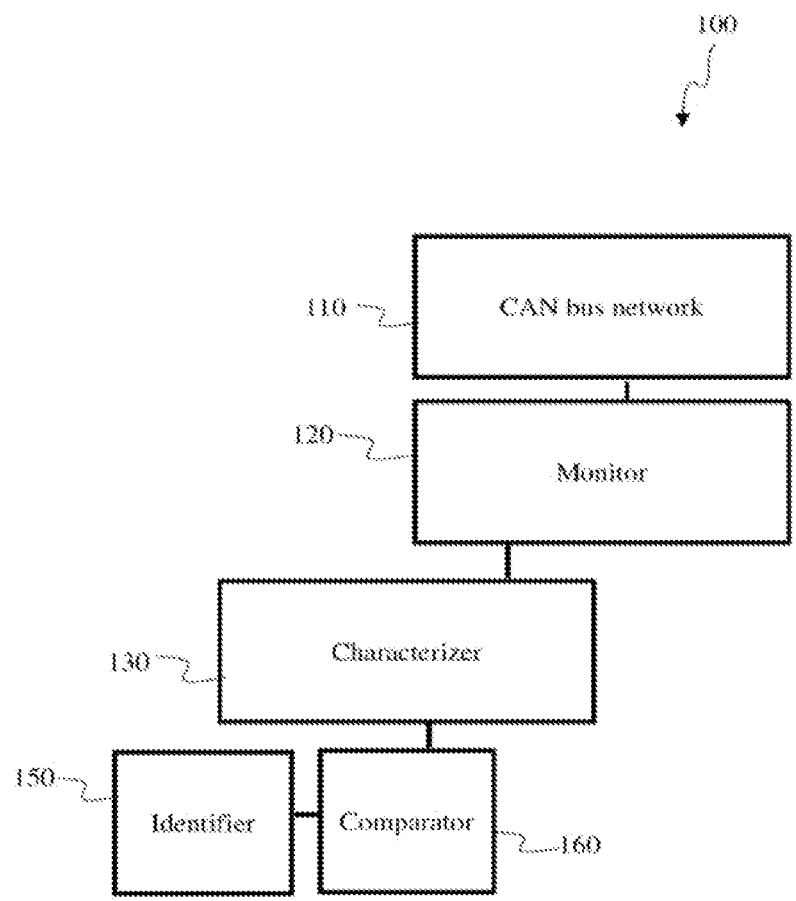
FIG. 1a is a schematic diagram of an embodiment of a security system for CAN bus attack originator identification.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. The present invention may be practiced according to the claims without some or all of these specific details. For the purpose of clarity, technical material that is known in the technical fields related to the invention has not been described in detail so that the present invention is not unnecessarily obscured.

The essence of the present invention is to provide a system and method for identifying an attack originator on a CAN bus communication network, and identifying the frames (or actual messages) that construct the attacks, as those frames are not sent from an authentic source. The ability to identify the source a message can assist in determining whether the message is authentic (sent from an authentic source).

The system disclosed herein is therefor designed to perform the following:

1. detect a threat while it is happening;
2. identify the communication frames that are part of the attack and differentiate between the malicious frames and the authentic frames; and,
3. provide tools for further offline forensics of the event.

It is further in the scope of the present invention to provide means and methods for mapping a CAN bus network, thereby providing a quick and accurate way to map different frames to the physical ECU from which they were sent.

Identifying the "real" source (i.e. the physical ECU) that had sent the malicious frames (either one of the on-board ECUs or an external/additional one) provides a starting point for further analysis of the source of the attack enabling to pin point weak points and compromised ECUs.

Anomaly-based intrusion detection involves creating models that specify what is "normal", or in other words, what is considered a legitimate traffic on the vehicle's network and what could be marked as suspicious. One important tool is to define the relations between different network frames.

Some of the relations between different frames are already disclosed in the network specifications. For example, a CAN-matrix file will contain information about the source ECU and destination ECUs for every given message. But other relations are not "pre-defined", rather they exist because of the physical, electrical or other properties of the vehicle. The present invention further provides a security system that actively maps these relations, and in some cases even without any prior knowledge of their existence, in a partially or fully automated process. This automated process involves running algorithms that actively and/or passively examine the network traffic in attempt to find such relations while defining the underlying process that caused these relations. Mapping these relations and characterizing the frames properties and the characteristics of their relation to one another can identify a cyber-attack originator on a CAN bus.

Two of the key relations that have proven to be useful for intrusion detection are correlation and causation. A correlation, in the time domain, would mean finding pairs of frames that always appear in about the same time. Causation would mean that the first message causes the appearance of the second message—this would be considered a correlation as well. This exemplifies the need to find and define the correct logic between system frames in order to distinguish between different types of events that would appear as correlated. Knowing the correct mapping of a network will allow better identification of an attack when the mapped logic is contradicted and fast identification of the attack originator ECU.

The term "vehicle" interchangeably refers hereinafter to any means of transportation that has at least one ECU attached to it, including, but not limited to, any motor vehicle, any aircraft, any emergency transport device such as an ambulance, fire engine and etc., any load carrying device such as a truck, van, and etc., any wheeled device such as car, truck, bus, sports car, cab, cabriolet, camper, motorcycle, scooter, bicycle, and etc., any outdoor field transport device such as a Jeep, jet ski water, snowmobile, snow plough, tank, and etc., any water transportation device such as a boat, ship, tank, steam boat, submarine, and etc., any agricultural transport device such as a combine, and etc., any construction transportation device such as a bulldozer, a tractor, fork-lift truck, dump truck and etc., any rail transportation device such as a train, cart, locomotive, tram, tramcar, and etc., any off-road vehicle, rocket, space capsule, spacecraft, space probe, spaceship, satellite, space shuttle, and the like as known in the art.

The term "CAN", "Controller Area Network", refers hereinafter to any controller network with a frame based protocol, for communication between devices without a host computer. CAN further provides a multi-master redundant network, operating even if some of the nodes are not functioning. CAN frames are not associated with a recipient address but are classified over their identifier. As a consequence, CAN controllers broadcast their frames to all connected nodes, when all receiving nodes decide independently whether to further process the received frames. CAN communication applies a decentralized priority driven access control methods to guarantee the transmission of a top priority frame first and an error detecting mechanism that can detect errors and interrupt communication. Further the term CAN includes, but not limited to, event triggered CAN bus, time triggered CAN bus, multimedia connected CAN bus, wireless connected CAN bus, or local small autonomous network such as LIN (local interconnected network) bus.

The term "bus", interchangeably refers hereinafter to a communication device used to logically connect at least two peripherals on the same wires or wireless means. This includes relaying communication between two or more peripherals (e.g. nodes). Additionally or alternatively, the bus can transfer data between components of the same computer, between different computers, between at least one peripheral and another bus, between other buses and any combination thereof. For example, expansion buses can be further connected to a system main bus (e.g. that is connecting a CPU with a memory unit), and form any peripheral bus. Other buses can be separate from a main CPU architecture, and can in fact support many CPUs thereby forming a network. Further, the term bus includes, but is not limited to all related hardware components (wire, optical fiber, etc.) and software, including communication protocols, for the operation of the bus. Additionally or alternatively, the bus can provide serial communication or parallel communication and can be connected in different topologies. Since all nodes in a system bus share the same communication line, schemes for avoiding collisions and interruptions and means of ordering an access to a combined source can be included. For example, a bus can be connected to a channel controllers, which is a small computer dedicated to handling the input and output of a given bus.

The term "nodes" refers hereinafter to any system or device connected to a network. This includes but is not limited to: an ECU (electronic control unit), a connection point, a redistribution point, a communication endpoint, a form of terminal equipment, a sensor, a computer, an electrical circuit, an electrical device or monitor, and others as known in electronic communication. The node can include features such as an additional communication port or bus connection. Additionally or alternatively, a network node is an active electronic device that is attached to a network, and is capable of sending, receiving, or forwarding information over a communications channel.

The term "ECU" refers hereinafter to any electronic control unit or embedded system that controls and/or monitors one or more of the electrical systems or subsystems in an apparatus such as a vehicle. This further includes hardware and software required to perform the functions expected from that particular module. These systems include but are not limited to: Electronic/engine Control Module (ECM), engine control unit, Door control unit (DCU), Transmission control unit (TCU), Brake Control Module (BCM; ABS or ESC), Battery management system, Powertrain Control Module (PCM), Transmission Control Module (TCM), Brake Control Module (BCM or EBCM), Central Control Module (CCM), Central Timing Module (CTM), General Electronic Module (GEM), Body Control Module (BCM), Suspension Control Module (SCM), control unit, control module, and other ECU's as known in the art. In addition the term further includes: Engine management ECU can be any ECU that controls one or more actuators on an engine to ensure optimal engine performance. This includes as non-limiting examples an ECU controlling the air-fuel mixture, ignition timing, idle speed, ignition timing, variable valve timing, electronic valve control, emission control, NOx control, regeneration of oxidation catalytic converter, turbocharger control, engine cooling system control, throttle control, lambda control, on-board diagnostics control, lubrication system control, fuel injection rate control and others as known in the art; A safety related ECU can include as non-limiting examples: anti-lock for the brakes, airbag control, hill descent control, emergency brake assistance system, front collision alert, and others as known in the art; passenger comfort related ECU like door control ECU, climate control (e.g. venting and/or air conditioning ECU; automatic or adaptive, electronic seat adjustment with memory, automatic wipers, automatic headlamps—adjusts beam automatically, lighting within the vehicle, and etc.; driver assistance related ECU can include these non-limiting examples: lane assist system, speed assist system, parking assistance system, blind spot detection, distance from a nearby object (e.g. car, wall), adaptive cruise control, hill start assist (e.g. hold the car for 10 seconds on an incline while you engage the clutch and accelerate), active trace control, Electric Power Steering Control Unit (PSCU); Human-machine interface (HMI) ECU, and others as known in the art; Chassis electronics ECU including ABS—Anti-lock Braking System, TCS—Traction Control System, EBD—Electronic Brake Distribution, ESP—Electronic Stability Program, body motion control, Active Engine Brake when cornering; Telematics control unit (TCU); Central Timing Module (CTM); Battery management ECU; infotainment system; and, any combination thereof.

Additionally or alternatively, one assembly incorporates several of the individual control modules (PCM is often both engine and transmission). It is further in the scope of the present invention that at least a two of a vehicle's ECU's are operatively connected by a CAN bus.

The term "telematics", refers hereinafter to all related to using computers in concert with telecommunications systems. This includes, but is not limited to all types of networks that rely on a telecommunications system to transport data. Typically, when telematics is used in the context of vehicles, whereby installed or after-factory device it refers to devices that, for example, collect and/or transmit data on vehicle use, maintenance requirements, automotive servicing, provide real-time information on usage of specific units/devices within a vehicle (e.g. air bag deployments, operation of door locking, and etc.), combine wireless communication with GPS tracking, navigation systems, remote control of vehicles, car crashes and locate stolen vehicles by using GPS technology. Further this can include data and/or communication with road transportation systems, road safety systems, multimedia systems, informatics databases, the internet, sensors, wireless/wired communication hardware and any combination thereof. Additionally or alternatively the data is transmitted in real time. Additionally or alternatively this includes smartphones connect to the vehicle computer system to pull data and can send the data to at least one recipient. In an embodiment the recipient can be a vehicle repairman, a vehicle insurance company, Employment Company, security company, a navigational model, driving instructor, driving supervisor, a defined individual, and any combination thereof.

The term "infotainment" refers hereinafter to any information-based media content or programming that combines entertainment content. Typically the term includes the hardware/software products and systems which are built into, or can be added to vehicles in order to enhance driver and/or passenger experience. This includes but not limited to services such as television, websites, social media websites and applications, print, radio, in-car entertainment and information systems (in-vehicle infotainment), managing and playing audio content, utilizing navigation for driving, delivering rear-seat entertainment such as movies, games, listening to incoming and sending outgoing text messages, making phone calls, and accessing Internet-enabled or smartphone-enabled content such as traffic conditions, sports scores and weather forecasts.

The term "Time based characteristics" interchangeably refers hereinafter to timing of frames within the CAN communication. Time based characteristics can be assessed for every specific frame and evaluated as to the relationship to one or more frames in terms of their timing. Initial timing of a frame includes: timing and synchronization and variation of the bit nominal time, specifically compared and analyzed to generate a value of time quanta within the bit nominal time segment (sync, prop, phase 1 and phase 2); timing and synchronization of frames in terms of system logic following an event (e.g. value received from a sensor), timing and synchronization of frames in terms of system logic following another frame (e.g. which frame is followed by another and when), and any combination thereof. Typically, CAN bus nodes are requested to be synchronized on the bit edges so that every node agrees on the value of the bit currently transmitted on the bus. To do so, each node implements a synchronization protocol. This ensures that the timing relations between a sent frame and a response frame are relatively reproducible.

Timing of more than one frames includes for example one frame from a specific node always transmitted following another specific frame from a designated node in a predetermined time lapse range); the transfer rate of an incoming frame is analyzed and compared to other system frames transfer rate, and any timing base data learned by the system and or inputted therein.

Timing analysis further includes, but not limited to, statistical analysis including average frame time difference, standard deviation of frame timing, and assurance of the statistical significance of the result (e.g. tests such as T-test, determining P value and as such). Further in the scope of the invention is calculating a timing parameter according to at least one of the aforementioned time based characteristics. This can further include calculating a value comprising individual timing of a frame and relevant timing in relevance to the system logic.

A dedicated algorithm measures the validity of an incoming frame based on statistical analysis, including a probability matrix, and/or a Gaussian probability curve. The purpose of preforming bus timing analysis is to extract the timing characteristics of the specified frame. Following statistical analysis the process can include clustering of the data to main groups and within them calculating the probabilities of each data point. In addition, a calculation can be performed to see the probability for any random new data point to be located in a specific cluster. Additionally or alternatively, a Markov model is utilized to determine the possible transition states. After executing at least initial timing analysis by such an algorithm in combination with a Markov model modeling the transitions possible of the data points, evaluating the probability of an event, is possible. Additionally or alternatively, rules can be applied in accordance with the system's expectations calculated by the algorithm. Additionally or alternatively, threshold values can be implemented in the algorithm following an initial analysis of a data set. Additionally or alternatively, each data set of a communication comprising frames comprising frames can be used to generate and evaluate timing characteristics specific to it. Additionally or alternatively, any change in the possible transitions states, the probability, the mean values (e.g. of a cluster or between clusters), variance, correlation, or spectral density of the data points can be an anomaly of a timing characteristic.

It is further in the scope of the present invention to extract timing characteristics as depicted above for the timing data difference between at least two frames.

It is further in the scope of the present invention to extract frequency characteristics as depicted above for the frequency data of a specific frame and/or difference between at least two frames.

It is further in the scope of the present invention to extract noise characteristics as depicted above for the noise data of a specific frame and/or difference between at least two frames.

It is further in the scope of the present invention to extract electrical characteristics as depicted above for any electrical data of a specific frame and/or difference between at least two frames.

It is in the scope of the present invention to extract at least one typical characteristic for each specific ECU originating communication frames connected to the CAN network.

It is further in the scope of the present invention to combine more than one frame and or communication characteristics to generate a frame profile. Additionally or alternatively comparing frame profiles will be used to detect anomalies.

It is further in the scope of the present invention to filter frames having a characteristic or profile not fitting predetermined or learned criteria.

The term "Electrical based characteristics" interchangeably refers hereinafter to different aspects of the physical electrical environment layer such as, voltage, current, number of conductors, impedance, RF emission and/or receiving, frequency. Additionally or alternatively, the noise characteristics on the transmission (e.g. on the electrical signal, on the RF signal) can be examined and referred to as a characteristic of the communication for the purpose of identification of an attack originator and mapping of the communication system.

The term "Learned over time" interchangeably refers hereinafter to the application of leaning algorithms and/or heuristic means for analyzing communication data (including frames send and received, their timing characteristics, their electrical characteristics, their data content, their noise characteristics, the events and/or sensor values relating to them, and as such) and for example detecting patterns and/or action and result sequences in order to make rules, assessments, expectations, of the system, including defining a base for comparison of future communication related activities.

Additionally or alternatively, when characterizing at least one ECU communication by said characterizing module and/or said mapping module, the characterization can be a factor of, for example, at least one or any combination thereof of: at least one frame communicated, an analysis of a plurality of (more than 1) frames at least temporarily stored and analyzed for at least one characteristic, characteristic set, a characteristics probability matrix, a Markov model of the optional characteristics of each ECU, statistical correlation examination of at least one characteristic to a set of data, statistical significance of at least one characteristic, the usability of using a specific characteristic in reference to its divergence, characterizing messages comprising one or more frames, the typical frame sequence, the typical frame timing, electrical based characteristics, time based characteristics, physical based characteristics.

Physical characteristics of the CAN bus refer herein after to any of the following non limiting examples: connector type and number, type of wire/cable, pin-outs, circuit configuration, wireless connection configuration and properties, if present, material any of the components are made of, number and type of any physical components embedded, such as conductors, resistors and etc., bus speed, and any combination thereof.

Each message sent between two network devices is often subdivided into packets comprising units of binary data being communicated through a computer network by the underlying hardware and software. Depending on the protocol, packets are usually constructed in some standard format determining their boundaries, origin and destination. Packets get encapsulated into frames in the data link layer so that they can be transferred over different media to the end destination. The term "frame" interchangeably refers hereinafter to a message format that is communicated in a CAN network. This includes both the base frame format (11 bits ID) and the extended frame format (29 bits ID made up of the 11-bit identifier ("base identifier") and an 18-bit extension ("identifier extension"). Additionally or alternatively, the term further includes the following frame types: data frame: a frame containing node data for transmission; remote frame: a frame requesting the transmission of a specific identifier; error frame: a frame transmitted by any node detecting an error; and, overload frame: a frame to inject a delay between data and/or remote frame.

The term "attack" in reference to an 'attack originator' refers herein to any attempted damage, unauthorized use or unauthorized access to bus communication or any connected ECU. This includes, as non-limiting examples: Unauthorized use of at least one ECU, unauthorized access to a communication; Communication timing attacks—such as delaying at least one communication packet/frame, changing the order of forwarding at least one communication packets/frame; Information attacks—leaking of at least a portion of information, false representation of at least a portion of the data, disruption, change, erasing at least a portion of the packet format, or information, changing the origin or destination of at least a portion of the communication, creating false communication, copying at least a portion of the information communicated, sending false validations; configuration attacks—such as false software update, false change in configuration, changing the access control, attacks against at least one ECU—such as preventing at least one ECU from operating normally or operating at all, propagation of malicious code (e.g. virus or worm); physical attacks—such as forcing rebooting, re-flashing booting modified software, attack on the core network—such as traffic tunneling between impersonated devices, using a rogue device, submitting multiple requests in an intention to overload the network and or the ECU; user data and identity attacks—such as impersonation of a device, retrieval of information of a specific user or a specific ECU, changing the access of users to the system, and others as known in the art.

Anomaly detection refers herein to any identification of such as but not limited to: items, events, patterns, observations which are incompatible and/or dissimilar and/or do not conform to a previously defined or expected event, event duration, event frequency, pattern or observation in a data set. Additionally or alternatively the comparison can be to a statistical expected value, to a range of defined values or one or more predefined exact values. The term further interchangeably refers to such as deviations, exceptions, peculiarities, surprise, noise, novelties, outliers and the like of one data compared to another. Additionally or alternatively, the anomaly detection technic is unsupervised anomaly detection, supervised anomaly detection, semi-supervised anomaly detection, and any combination thereof. Supervised anomaly detection refers to detection based on exiting normal data labels and anomalies data labels. Semi-supervised anomaly detection refers to the occurrence of a limited amount of labeled data in the process of detection. This typically involves the creation of a model based on the limited data set followed by testing the statistical significance of a test instance to be generated by the model. Unsupervised anomaly detection—No data labels available, bases on the relatively low occurrence of abnormal data characteristic. Additionally or alternatively, the anomaly is a point anomaly, contextual anomaly, structural anomaly, collective anomaly, and any combination thereof. Additionally or alternatively, statistical means are employed to examine the occurrence of an anomaly and to try and determine whether its occurrence is a stochastic process, has a certain degree of probability, whether it is a time and/or activity related event. Additionally or alternatively, anomaly refers to any divergence from a possibility probability matrix generated (predefined and/or self-learned, and or updated) to predict at least one event such as the probability of a specific frame to follow another frame, each having its own defined characteristics and/or their relative values have a specific characteristic and/or their connection provides a related characteristic. Additionally or alternatively, the anomaly detection compares at least one of: one or more bit content, arbitration field content, control bit content, data bit content, CRC field content, at least one frame, at least one message comprised of a plurality of frames, at least one frame characteristic, at least one frame relation characteristic, and ant combination thereof.

According to another embodiment of the invention, the characterization module is configured to preform preprocessing to remove anomalous data from the dataset, when characterizing the monitored traffic to obtain a statistically significant increase in accuracy.

The term "a third party" in reference to a recipient of at least one notification sent by the security system of the present invention interchangeably refers herein to at least one of these non-limiting examples: a computer, a terminal, a phone, a cellular phone, a PDA, an E-mail, a visual alarm (lights, any physical difference observed visually), an audible alarm, a sensible alarm, a server, an additional security system, an administer, a node, an ECU, a vehicle central computer, a vehicle driver, a vehicle passenger, and any combination thereof.

It is further in the scope of the present invention to utilize the characterization of a frame and the logistics of the relation between frames to actively map a bus communication system.

The term "Computer readable media", (CRM), interchangeably refers hereinafter to any medium, e.g., a non-transitory medium, capable of storing data in a format readable by a mechanical device (automated data medium rather than human readable). Examples of machine-readable media include magnetic media such as magnetic disks, cards, tapes, and drums, punched cards and paper tapes, optical disks, flash memories, barcodes and magnetic ink characters. Common machine-readable technologies include magnetic recording, processing waveforms, electronic memory encoding, and barcodes. Optical character recognition (OCR) can be used to enable machines to read information available to humans. Any information retrievable by any form of energy can be machine-readable.

The term "event", interchangeably refers herein after to any case in which an anomaly is detected leading to generation of an event comprising a logging of data into a data base or forwarding of data to at least one recipient. The data includes, but not limited to, at least one of: one or more frames for which an anomaly is detected, anomaly characteristic, time of generating the event, origin of the frame, all characteristics of the frame that are not detected as an anomaly, against which characteristic was the frame compared to when the anomaly was detected, if the anomaly is based on a statistical measure what is the statistical data basis (significance) or what is the score of the anomaly in relation to an expected value, to what ECU is the frame related to (originating from and/or sent to), the frame properties (e.g. content, frame type, signature and etc.), and any combination thereof.

The term "similar" in reference to a frame (e.g. a similar frame), interchangeably refers herein to a frame having at least one similar characteristic, at least partially identical content, at least partially identical frame properties and any combination thereof.

Reference is now made to FIG. 1a, schematically representing in an out of scale manner a diagram of the invention. According to one embodiment of the invention, a security system (100), useful for vehicle CAN bus communication (110) attack originator identification, comprising: (a) one or more CAN Bus Monitor (120), (CBM), configured to monitor the CAN bus communication comprising one or more frames, to and/or from at least one Electronic Control Unit, (ECU); (b) one or more Characterization module (130) in communication with the CBM, configured to generate at least one characteristic for the monitored communication from each the ECU and at least one characteristic for each communication frame; (c) one or more Comparator unit (160) in communication with the characterization module, configured to compare one or more the characteristics of at least one frame against characteristics of each the ECU communication in order to detect at least one anomaly; and, (d) one or more Identification module (150) in communication with the Comparator (160), configured to identify at least one ECU originating an attack on the CAN bus (110); wherein the Comparator unit (160) is configured to generate at least one event for at least one detected anomaly comprising at least one characteristic difference and forward the event to the identification module configured to identify at least one ECU originating the attack according to the characteristic difference.

According to another embodiment of the invention, the system as described above is disclosed, wherein one or more of the ECU is selected from: (a) an On-board ECU installed during a vehicle manufacturing process; (b) an ECU installed post vehicle assembly by a manufacturer; (c) an ECU physically added to the CAN BUS by an attacker; and, (d) any combination thereof.

According to another embodiment of the invention, the system as described above is disclosed, wherein the ECU is at least one of: (a) engine management ECU; (b) transmission management ECU; (c) safety related ECU; (d) telematics control unit (TCU); (e) brake control ECU; (f) central timing module (CTM) ECU; (g) passenger comfort related ECU; (h) human-machine interface (HMI) ECU; (i) battery management ECU; (j) driver assistance ECU; (k) chassis electronics ECU; (l) infotainment ECU; and, (m) any combination thereof.

According to another embodiment of the invention, the system as described above is disclosed, wherein the characterization module is configured to receive the monitored communication from more than one CAN bus monitor.

According to another embodiment of the invention, the system as described above is disclosed, wherein the system further comprises at least one message database operatively in communication with at least the characterization module, the message database configured to store at least one monitored frame and one or more characteristic of the frame and/or the ECU communication provided by the characterization module.

According to another embodiment of the invention, the system as described above is disclosed, wherein the message database is operatively in communication with the comparator configured to receive at least one characteristic for comparing to at least one monitored frame.

According to another embodiment of the invention, the system as described above is disclosed, wherein the characterization module is configured to generate at least one characteristic selected from: (a) time based characteristic; (b) electrical based characteristic; (c) noise based characteristic; (d) physical CAN bus characteristic; and, (e) any combination thereof;

According to another embodiment of the invention, the system as described above is disclosed, wherein the characterization module is further configured to evaluate time based characteristics selected from: (a) timing between consecutive frames; (b) timing between a frame and the last similar frame; (c) timing between predefined frame patterns; (d) timing between detected frame patterns; (e) sequence in which frames are transmitted; (f) timing distribution within frame patterns; (g) timing between different frame types; (h) timing between same frame types; (i) timing between interframe spaces; and, (j) any combination thereof.

According to another embodiment of the invention, the system as described above is disclosed, wherein at least one evaluated frame originates from at least one of: (a) the ECU, (b) at least one first the frame originates from the ECU and at least a second the frame originates from at least a second ECU; and, (c) any combination thereof.

According to another embodiment of the invention, the system as described above is disclosed, wherein the Comparator compares against one or more the characteristics selected from: (a) learned over time; (b) predefined; (c) updated in real-time; (d) updated remotely; and, (e) any combination thereof.

According to another embodiment of the invention, the system as described above is disclosed, wherein the identification module is further configured to forward at least one event and/or the identified attack originator to at least one selected from: (a) a driver of a vehicle comprising at least a portion of the CAN bus by means of a dedicated human machine interface; (b) one or more the ECU; (c) one or more third party system located in the vehicle comprising at least a portion of the CAN bus; (d) one or more external system; and, (e) any combination thereof.

According to another embodiment of the invention, the system as described above is disclosed, wherein the system further comprises at least one mapping module operatively in communication with at least the characterization module and the bus communication, the mapping module comprising: (a) a sending unit configured to send one or more input frames in order to induce at least one response frame; and, (b) at least one mapping database comprising monitored response frame characteristics of each the responding ECU and/or frame relation characteristics generated by the characterization module between at least one sent frame and one or more the response frame; further wherein the mapping module is configured to actively send one or more frames in order to induce at least one response frame; the monitored response frame characterized by the characterization module for generating at least one characteristic of the response frame originating ECU and/or at least one relation characteristics between at least one sent frame and one or more the response frame.

According to another embodiment of the invention, the system as described above is disclosed, wherein the mapping module is configured to log in the mapping database at least one of: one or more the relation characteristic between at least one sent frame and at least one response frame, response frames, the response frames characteristics, the response frames originating ECU characteristics, and any combination thereof.

According to another embodiment of the invention, the system as described above is disclosed, wherein the mapping module is configured to generate at least one probability matrix of possible the response frames and/or the response frames characteristics and/or the frame relation characteristics for at least one sent frame according to the mapping database.

According to another embodiment of the invention, the system as described above is disclosed, wherein one or more of the comparator unit(s) is configured to perform at least one of: (a) compare one or more the characteristics of at least one monitored frame, against one or more the probability matrix provided characteristic; (b) compare at least one relation characteristics between at least one first frame and at least one second frame against one or more the probability matrix provided relation characteristic; and, (c) any combination thereof; in order to detect at least one anomaly.

According to another embodiment of the invention, the system as described above is disclosed, wherein the relation characteristic comprises at least one of: (a) timing between sending at least one frame and receiving at least one response frame; (b) type(s) of the response frame received and the type(s) of the sent frame; (c) number of the sent frames in order to receive at least one response frame; (d) number of the response frames received in following at least one sent frame; (e) the response frame and the sent frame content; (f) sequence of the response frames following at least one sent frame; (g) sequence of the sent frames in order to receive at least one response frame; (h) the sent frame and the response frame at least one characteristic selected from: time based characteristic, electrical based characteristic, physical CAN BUS based characteristic, and any combination thereof; (i) the sent frame and the response frame one or more time evaluated characteristic selected from: (i) timing between consecutive frames; (ii) timing between a frame and a last similar frame; (iii) timing between predefined frame patterns; (iv) timing between learned patterns; (v) sequence in which frames are transmitted; and, (vi) any combination thereof; and, (j) any combination thereof.

According to another embodiment of the invention, the system as described above is disclosed, wherein the comparator unit is further operatively in communication with the mapping module; further wherein the comparator is configured to compare the one or more the characteristic of at least one frame to at least one characteristic of a selected from: (a) at least one response frame previously induced by the mapping module; (b) at least one response frame logged in the mapping database as being induced by a similar frame as the compared frame; (c) at least one sent frame and one response frame logged in the mapping database when the sent frame is similar to the compared message frame; (d) at least one monitored frame not induced by the mapping module; (e) at least one characteristic selected from: time based characteristic, electrical based characteristic, noise based characteristic, physical CAN bus characteristic; and, any combination thereof, from the mapping database; and, (f) any combination thereof; in order to detect at least one anomaly.

According to another embodiment of the invention, the system as described above is disclosed, wherein the mapping module is configured to send at least one frame selected from: (a) monitored communication frame, (b) modified communication frame; (c) predefined communication frame; (d) error communication frame; (e) data communication frame; (f) overload communication frame; (g) remote communication frame; and, (h) any combination thereof, in order to induce at least one response frame.

Figure 1B:
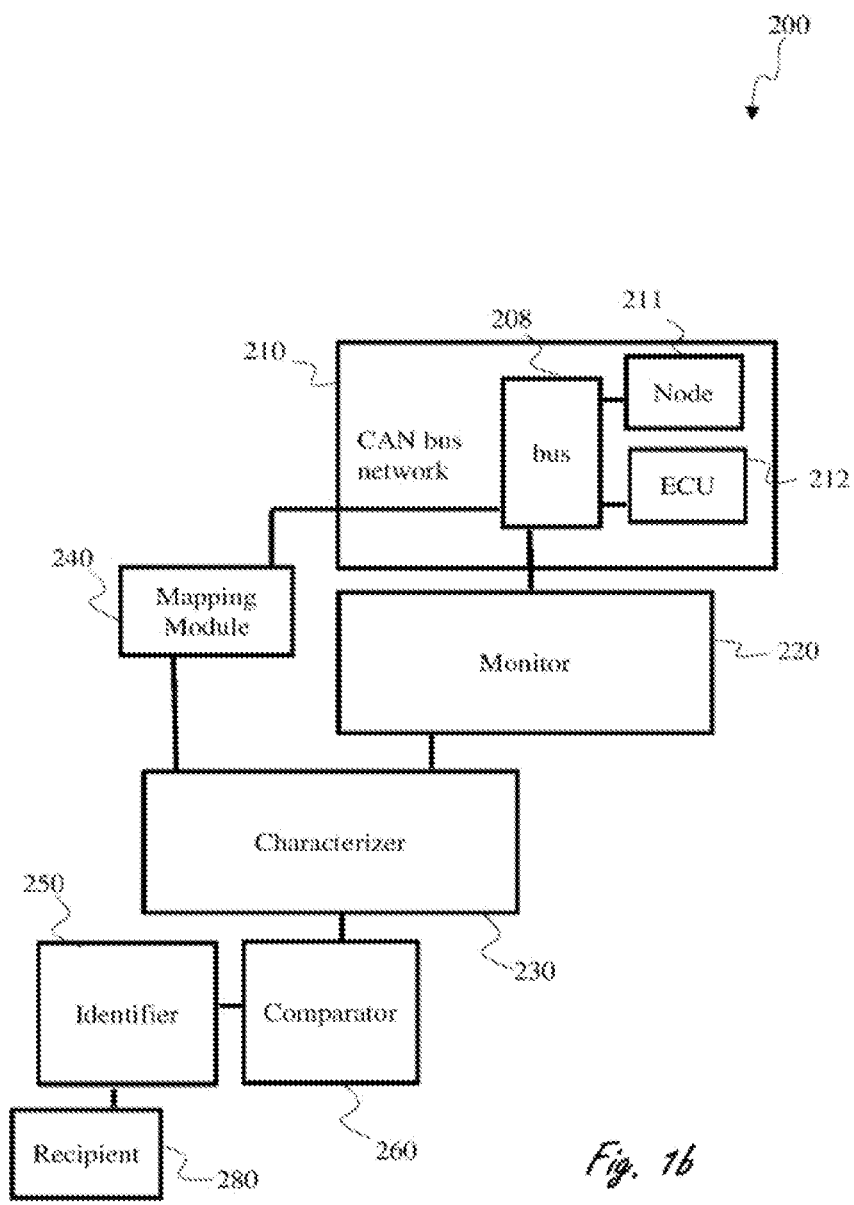
FIG. 1b is a schematic out diagram of an embodiment of a security system for CAN bus attack originator identification.

Reference is now made to FIG. 1b, schematically representing in an out of scale manner another embodiment of the invention. According to one embodiment of the invention, a security system (200), useful for vehicle CAN bus communication (210) attack originator identification, comprising: (a) one or more CAN Bus Monitor (220), (CBM), configured to monitor the CAN bus communication (210) comprising one or more frames, to and/or from at least one Electronic Control Unit, (ECU) (212, 211); (b) one or more Characterization module (230) in communication with the CBM (220), configured to generate at least one characteristic for the monitored communication from each the ECU (212, 211) and at least one characteristic for each communication frame; (c) one or more Comparator unit (260) in communication with the characterization module (230), configured to compare one or more the characteristics of at least one frame against characteristics of each the ECU communication in order to detect at least one anomaly; and, (d) one or more Identification module (250) in communication with the Comparator (260), configured to identify at least one ECU originating an attack on the CAN bus (210); wherein the Comparator unit (260) is configured to generate at least one event for at least one detected anomaly comprising at least one characteristic difference and forward the event to the identification module configured to identify at least one ECU originating the attack according to the characteristic difference. The system additionally comprises at least one mapping module (240) configured to actively send frames into the network in order to induce response frames. These response frames are then characterized by the characterization module (230) to provide a matrix of possible characteristics and/or frames typical of each ECU (212) originating the frame. Further, the comparator can compare the data from the mapping module of typical ECU characteristics to at least one monitored frame in order to scan for at least one anomaly. In this manner, the security system of the present invention does not only passively monitor communication traffic, in order to but actively create communication scenarios and simulate many communication possibilities, thereby providing more accurate and rapid mapping data and expected characteristics range of the frames from each ECU.

Figure 2:
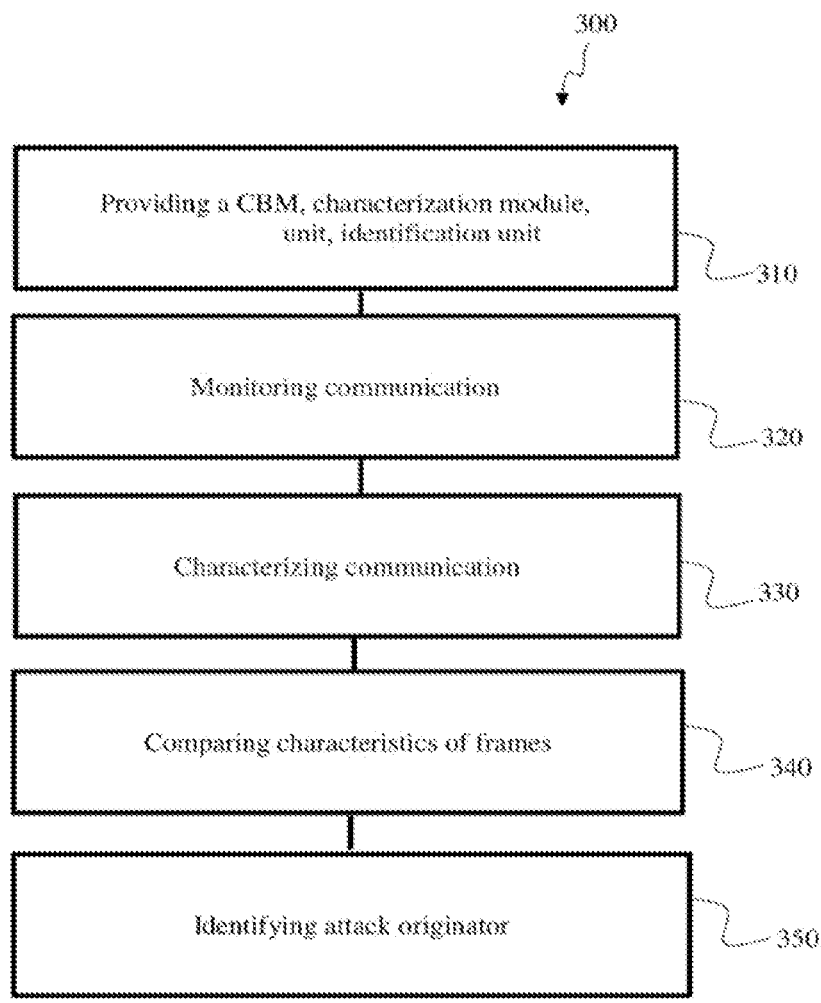
FIG. 2 is a schematic diagram of an embodiment of a method for CAN bus attack originator identification.

Reference is now made to FIG. 2, schematically representing in an out of scale manner an embodiment of a method of the present invention. According to one embodiment of the invention a method for vehicle CAN bus communication attack originator identification, comprising the steps of: (a) providing (310): (i) one or more CAN Bus Monitor(s), (CBM), configured to monitor the CAN bus communication comprising one or more frames, to and/or from at least one Electronic Control Unit, (ECU); (ii) one or more Characterization module(s) in communication with the CBM, configured to generate at least one characteristic for the monitored communication for each the ECU and at least one characteristic for each communication frame; (iii) one or more Comparator unit(s) in communication with the characterization module, configured to compare one or more the characteristics of at least one frame against characteristics of each the ECU communication in order to detect at least one anomaly; and, (iv) one or more Identification module(s) in communication with the Comparator, configured to identify at least one ECU originating an attack on the CAN bus; (b) monitoring (320) the CAN bus communication to and from at least one ECU by means of the monitoring unit; (c) (330) characterizing the communication (at least one frame) by generating at least one characteristics of the monitored communication by means of the Characterization module; (d) comparing (340) at least one characteristics of at least one frame by means of the comparator against at least one ECU characteristics in order to detect at least one anomaly; (e) identifying (350) at least one ECU by means of the identification module, originating an attack on the CAN bus; wherein the step (d) of comparing at least one characteristic by the comparator additionally comprising generating at least one event for at least one detected anomaly comprising at least one characteristic difference and forwarding the event to the identification module configured to identify at least one ECU originating the attack according to the characteristic difference.

According to another embodiment of the invention, the method as described above is disclosed, additionally comprising the step of providing one or more of the ECU from: (a) an On-board ECU installed during a vehicle manufacturing process; (b) an ECU installed post vehicle assembly by a manufacturer; (c) an ECU physically added to the CAN BUS by an attacker; and, (d) any combination thereof.

According to another embodiment of the invention, the method as described above is disclosed, additionally comprising the step of providing one or more of the ECU selected from (a) engine management ECU; (b) transmission management ECU; (c) safety related ECU; (d) telematics control unit (TCU); (e) brake control ECU; (f) central timing module (CTM) ECU; (g) passenger comfort related ECU; (h) human-machine interface (HMI) ECU; (i) battery management ECU; (j) driver assistance ECU; (k) chassis electronics ECU; (l) infotainment ECU; and, (m) any combination thereof.

According to another embodiment of the invention, the method as described above is disclosed, additionally comprising the step of providing the characterization module configured to receiving monitored traffic from more than one CAN bus Monitor.

According to another embodiment of the invention, the method as described above is disclosed, additionally comprising the steps of: (a) providing the system further comprising at least one message database operatively in communication with at least the characterization module; and, (b) storing by means of the message database at least one monitored frame and one or more characteristic of the frame and/or the ECU communication provided by the characterization module.

According to another embodiment of the invention, the method as described above is disclosed, additionally comprising the steps of: (a) providing the message database operatively in communication with the comparator configured to receive at least one characteristic from the database; and, (b) receiving by means of the comparator at least one characteristic from the database and comparing the characteristic to at least one monitored frame characteristic.

According to another embodiment of the invention, the method as described above is disclosed, additionally comprising the step of the characterization module generating at least one characteristic selected from: (a) time based characteristic; (b) electrical based characteristic; (c) noise based characteristic; (d) physical CAN bus characteristic; and, € any combination thereof.

According to another embodiment of the invention, the method as described above is disclosed, additionally comprising the step of the characterization module evaluating time based characteristics selected from: (a) timing between consecutive frames; (b) timing between a frame and the last similar frame; (c) timing between predefined frame patterns; (d) timing between detected frame patterns; (e) sequence in which frames are transmitted; (f) timing distribution within frame patterns; (g) timing between different frame types; (h) timing between same frame types; (i) timing between interframe spaces; and, (j) any combination thereof.

According to another embodiment of the invention, the method as described above is disclosed, additionally comprising the step of selecting at least one evaluated frame originating from at least one of: (a) the ECU; (b) at least one first the frame originates from the ECU and at least a second the frame originates from at least a second ECU; and, (c) any combination thereof.

According to another embodiment of the invention, the method as described above is disclosed, additionally comprising the step of comparing by means of the Comparator against one or more the characteristics selected from: (a) learned over time; (b) predefined; (c) updated in real-time; (d) updated remotely; and, (e) any combination thereof.

According to another embodiment of the invention, the method as described above is disclosed, additionally comprising the step of the identification module forwarding at least one event and/or the identified attack originator to at least one selected from: (a) a driver of a vehicle comprising at least a portion of the CAN bus by means of a dedicated human machine interface; (b) one or more the ECU; (c) one or more third party system located in the vehicle comprising at least a portion of the CAN bus; (d) one or more external system; and, (e) any combination thereof.

According to another embodiment of the invention, the method as described above is disclosed, additionally comprising the steps of: (a) providing the system further comprises at least one mapping module operatively in communication with at least the characterization module and the bus communication, the mapping module comprising (i) a sending unit configured to send one or more input frames in order to induce at least one response frame; and, (ii) at least one mapping database comprising monitored response frame characteristics of each the responding ECU and/or frame relation characteristics generated by the characterization module between at least one sent frame and one or more the response frame; (b) the mapping module actively sending one or more frames for inducing at least one response frame; and, (c) the characterization module characterizing the monitored response frame for generating at least one characteristic of the response frame originating ECU and/or at least one relation characteristics between at least one sent frame and one or more the response frame.

According to another embodiment of the invention, the method as described above is disclosed, additionally comprising the step of the mapping module logging into the mapping database at least one of: one or more the relation characteristic between at least one sent frame and at least one response frame, response frames, the response frames characteristics, the response frames originating ECU characteristics, and any combination thereof.

According to another embodiment of the invention, the method as described above is disclosed, additionally comprising the step of generating by means of the mapping module at least one probability matrix of possible the response frames and/or the response frames characteristics and/or the frame relation characteristics for at least one sent frame according to the mapping database.

According to another embodiment of the invention, the method as described above is disclosed, additionally comprising the steps of performing by means of one or more of the comparator unit(s) at least one of: (a) comparing one or more the characteristics of at least one monitored frame, against one or more the probability matrix provided characteristic; (b) comparing at least one relation characteristics between at least one first frame and at least one second frame against one or more the probability matrix provided relation characteristic; and, (c) any combination thereof; in order to detect at least one anomaly.

According to another embodiment of the invention, the method as described above is disclosed, wherein the relation characteristic comprising at least one of: (a) timing between sending at least one frame and receiving at least one response frame; (b) type(s) of the response frame received and the type(s) of the sent frame; (c) number of the sent frames in order to receive at least one response frame; (d) number of the response frames received in following at least one sent frame; (e) the response frame and the sent frame content; (f) sequence of the response frames following at least one sent frame; (g) sequence of the sent frames in order to receive at least one response frame; (h) the sent frame and the response frame at least one characteristic selected from: time based characteristic, electrical based characteristic, physical CAN BUS based characteristic, and any combination thereof; (i) the sent frame and the response frame one or more time evaluated characteristic selected from: (i) timing between consecutive frames; (ii) timing between a frame and a last similar frame; (iii) timing between predefined frame patterns; (iv) timing between learned patterns. (v) sequence in which frames are transmitted; and, (vi) any combination thereof; and, any combination thereof.

According to another embodiment of the invention, the method as described above is disclosed, additionally comprising the steps of: (a) the comparator unit is further operatively communicating with the mapping module; and, (b) Comparing by means of the comparator one or more the characteristic of at least one frame to at least one characteristic of a selected from: (i) at least one response frame previously induced by the mapping module; (ii) at least one response frame logged in the mapping database as being induced by a similar frame as the compared frame; (iii) at least one sent frame and one response frame logged in the mapping database when the sent frame is similar to the compared message frame; (iv) at least one monitored frame not induced by the mapping module; (v) at least one characteristic selected from: time based characteristic, electrical based characteristic, noise based characteristic, physical CAN bus characteristic; and, any combination thereof, from the mapping database; and, (vi) any combination thereof; in order to detect at least one anomaly.

According to another embodiment of the invention, the method as described above is disclosed, additionally comprising the step of the mapping module sending frames selected from: (a) monitored communication frame; (b) modified communication frame; (c) predefined communication frame; (d) error communication frame; (e) data communication frame; (f) overload communication frame; (g) remote communication frame; and, (h) any combination thereof, in order to induce response frames.

Figure 3:
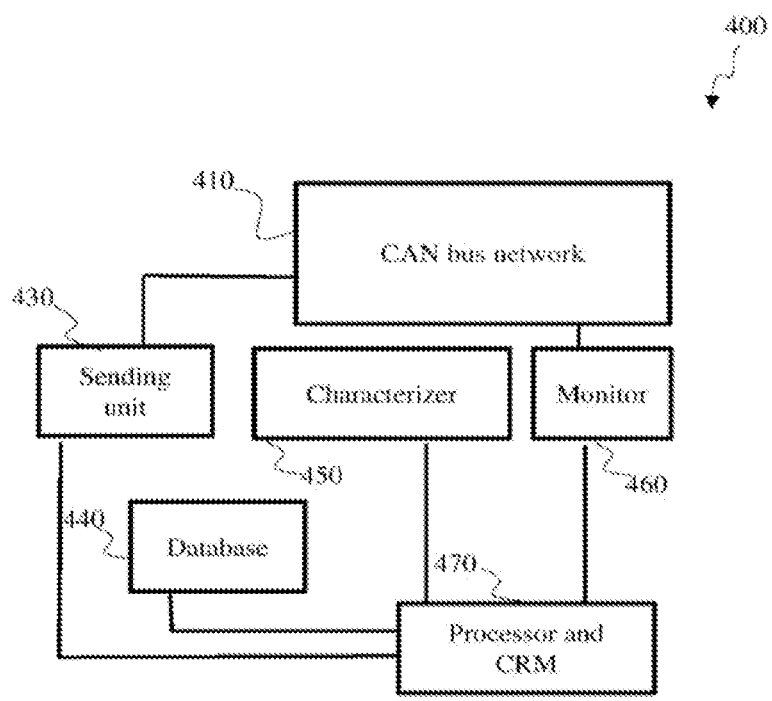
FIG. 3 is a schematic diagram of an embodiment of a system for CAN bus communication mapping.

Reference is now made to FIG. 3, schematically representing in an out of scale manner an embodiment of the invention. According to one embodiment of the invention a vehicle CAN bus network (410) mapping system (400), comprising: (a) one or more CAN Bus Monitor(s), (CBM) (460), configured to monitor the CAN bus communication (410) comprising one or more frames to and/or from at least one Electronic Control Unit, (ECU); (b) at least one sending unit (430) configured to send frames into the CAN bus network (410) for inducing at least one response frame; (c) one or more Characterization module(s)(450) in communication with the CBM, configured to provide and at least one characteristic for each the ECU monitored communication and/or frame relation characteristics generated by the characterization module between at least one sent frame and one or more the response frame; (d) one or more mapping database (440) operatively in communication with the sending unit (430) and the characterization module (450); the mapping database (440) comprising monitored response frame characteristics of each the responding ECU and/or frame relation characteristics, generated by the characterization module (450) between at least one sent frame and one or more the response frame; (e) at least one processor (470) in communication with a non-transient computer readable medium (CRM); the processor executes a set of operations received from the CRM; the set of operations are: (i) sending at least one frame by means of the sending unit in order to induce at least one response frame; (ii) monitoring the CAN bus communication by means of the CBM; (iii) characterizing at least one response frame, and/or the relation between the sent frame and the response frame by means of the characterization module and generating; and, (iv) logging the sent frame, one or more the response frame characteristic and/or one or more relation characteristics between the sent frame and at least one response frame into the mapping database; wherein the processor is configured to generate one or more probability matrix comprising at least one of: possible response frames, possible response frames characteristics, possible characteristics of each ECU originating communication, possible relation characteristics, and any combination thereof, for at least one sent frame according to the mapping database.

Additionally or alternatively, the mapping system is partially or fully automatic.

According to another embodiment of the invention, the system as described above, wherein one or more of the ECU is selected from: (a) an On-board ECU installed during a vehicle manufacturing process; (b) an ECU installed post vehicle assembly by a manufacturer; (c) an ECU physically added to the CAN BUS by an attacker; and, (d) any combination thereof.

According to another embodiment of the invention, the system as described above, wherein the ECU is at least one of: (a) engine management ECU; (b) transmission management ECU; (c) safety related ECU; (d) telematics control unit (TCU); (e) brake control ECU; (f) central timing module (CTM) ECU; (g) passenger comfort related ECU; (h) human-machine interface (HMI) ECU; (i) battery management ECU; (j) driver assistance ECU; (k) chassis electronics ECU; (l) infotainment ECU; and, (m) any combination thereof.

According to another embodiment of the invention, the system as described above, wherein the characterization module is configured to receive monitored communication from more than one CBM.

According to another embodiment of the invention, the system as described above, wherein the characterization module is configured to generate at least one frame characteristic selected from: (a) time based characteristic; (b) electrical based characteristic; (c) noise based characteristic; (d) physical CAN bus characteristic; and, (e) any combination thereof.

According to another embodiment of the invention, the system as described above, wherein the characterization module is further configured to evaluate time based characteristics selected from: (a) timing between consecutive frames; (b) timing between a frame and the last similar frame; (c) timing between predefined frame patterns; (d) timing between detected frame patterns; (e) sequence in which frames are transmitted; (f) timing distribution within frame patterns; (g) timing between different frame types; (h) timing between same frame types; (i) timing between inter-frame spaces; and, (j) any combination thereof.

According to another embodiment of the invention, the system as described above, wherein at least one evaluated frame originates from at least one of: (a) the ECU; (b) at least one first the frame originates from the ECU and at least a second the frame originates from at least a second ECU; and, (c) any combination thereof.

According to another embodiment of the invention, the system as described above, wherein the relation characteristic comprises at least one of: (a) timing between sending at least one frame and receiving at least one response frame; (b) type(s) of the response frame received and the type(s) of the sent frame; (c) number of the sent frames in order to receive at least one response frame; (d) number of the response frames received in following at least one sent frame; (e) the response frame and the sent frame content; (f) sequence of the response frames following at least one sent frame; (g) sequence of the sent frames in order to receive at least one response frame; (h) the sent frame and the response frame at least one characteristic selected from: time based characteristic, electrical based characteristic, physical CAN BUS based characteristic; (i) the sent frame and the response frame one or more time evaluated characteristic selected from: (i) timing between consecutive frames; (ii) timing between a frame and a last similar frame; (iii) timing between predefined frame patterns; (iv) timing between learned patterns; (v) sequence in which frames are transmitted; and, (j) any combination thereof.

According to another embodiment of the invention, the system as described above, wherein the system further comprises one or more comparator unit(s) in communication with the characterization module and the mapping database, and one or more Identification module(s) in communication with the comparator unit, the comparator is configured to perform at least one of: (a) compare one or more the characteristics of at least one monitored frame, against at least one of: (i) one or more the characteristics of at least one response frame; (ii) one or more the ECU originating communication characteristic; (iii) one or more the probability matrix provided characteristic; (b) compare at least one relation characteristics between at least one first frame and at least one second frame against: (i) one or more relation characteristic between at least one sent frame and at least one response frame; (ii) one or more the probability matrix provided relation characteristic; and, (c) any combination thereof; in order to detect at least one anomaly;

the identification module is configured to receive at least one anomaly from the comparator unit and identify at least one ECU originating the attack according to the characteristic difference.

According to another embodiment of the invention, the system as described above, wherein the comparator is configured to compare the one or more the characteristic of at least one frame to at least one characteristic of a selected from: (a) at least one response frame induced by the mapping module; (b) at least one response frame logged in the mapping database as being induced by a similar frame as the compared frame; (c) at least one sent frame and one response frame logged in the mapping database when the sent frame is similar to the compared message frame; (d) at least one monitored frame not induced by the mapping module; and, (e) any combination thereof; in order to detect at least one anomaly.

According to another embodiment of the invention, the system as described above, wherein the comparator compares against one or more the characteristics selected from: (a) learned over time; (b) predefined; (c) updated in real-time; (d) updated remotely; and, (e) any combination thereof.

According to another embodiment of the invention, the system as described above, wherein the identification module is further configured to forward at least one event and/or the identified attack originator to at least one selected from: (a) a driver of a vehicle comprising at least a portion of the CAN bus by means of a dedicated human machine interface; (b) one or more the ECU; (c) one or more third party system located in the vehicle comprising at least a portion of the CAN bus; (d) one or more external system; and, (e) any combination thereof.

According to another embodiment of the invention, the system as described above, wherein the sending module is configured to send at least one frame selected from: (a) monitored communication frame; (b) modified communication frame; (c) predefined communication frame; (d) error communication frame; (e) data communication frame; (f) overload communication frame; (g) remote communication frame; and, (h) any combination thereof, in order to induce at least one response frame.

Figure 4:
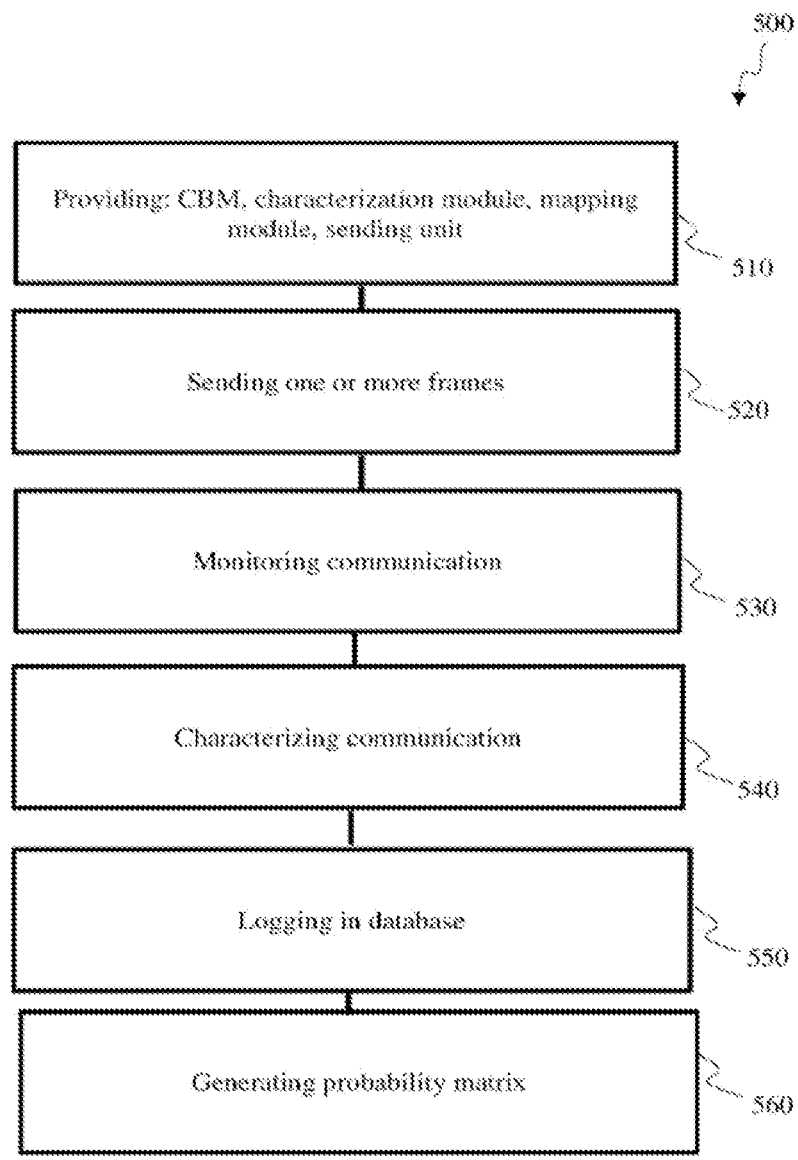
FIG. 4 is a schematic diagram of an embodiment of a method for CAN bus communication mapping.

Reference is now made to FIG. 4, schematically representing in an out of scale manner an embodiment of the invention. According to one embodiment of the invention a method (500) for mapping a vehicle CAN bus network, comprising the steps of: (a) providing (510) (i) one or more CAN Bus Monitor(s), (CBM), configured to monitor the CAN bus communication comprising one or more frames to and/or from at least one Electronic Control Unit, (ECU); (ii) at least one sending unit configured to send frames into the CAN bus network for inducing at least one response frame; (iii) one or more characterization module(s) in communication with the CBM, configured to provide and at least one characteristic for each the ECU monitored communication and/or frame relation characteristics generated by the characterization module between at least one sent frame and one or more the response frame; (iv) at least one mapping module comprising a mapping database, operatively in communication with the sending unit and the characterization module; the mapping database comprising monitored response frame characteristics of each the responding ECU and/or frame relation characteristics, generated by the characterization module between at least one sent frame and one or more the response frame; (b) sending (520) at least one frame by means of the sending unit; (c) monitoring (530) the CAN bus communication by means of the CBM; (d) characterizing (540) at least one response frame, and/or the relation between the sent frame and the response frame by means of the characterization module; and, (e) logging 550) the sent frame, one or more the response frame characteristic and/or one or more relation characteristics between the sent frame and at least one response frame into the mapping; wherein the method additionally comprises the step of generating (560) at least one probability matrix of possible response frames and/or the response characteristics by means of the mapping module for at least one sent frame according to the mapping database.

Additionally or alternatively, the mapping system is partially or fully automatic.

According to another embodiment of the invention, the method as described above, additionally comprising the step of providing the ECU from at least one of: (a) an On-board ECU installed during a vehicle manufacturing process; (b) an ECU installed post vehicle assembly by a manufacturer; (c) an ECU physically added to the CAN BUS by an attacker; and, (d) any combination thereof.

According to another embodiment of the invention, the method as described above, additionally comprising the step of providing the ECU from at least one of: (a) engine management ECU; (b) transmission management ECU; (c) safety related ECU; (d) telematics control unit (TCU); (e) brake control ECU; (f) central timing module (CTM) ECU; (g) passenger comfort related ECU; (h) human-machine interface (HMI) ECU; (i) battery management ECU; (j) driver assistance ECU; (k) chassis electronics ECU; (l) infotainment ECU; and, (m) any combination thereof.

According to another embodiment of the invention, the method as described above, additionally comprising the step of the characterization module receiving the monitored communication from more than one CBM.

According to another embodiment of the invention, the method as described above, additionally comprising the step of the generating by means of the characterization module at least one frame characteristic selected from: (a) time based characteristic; (b) electrical based characteristic; (c) noise based characteristic; (d) physical CAN bus characteristic; and, (e) any combination thereof.

According to another embodiment of the invention, the method as described above, additionally comprising the step of evaluating by means of the characterization module, time based characteristics selected from: (a) timing between consecutive frames; (b) timing between a frame and the last similar frame; (c) timing between predefined frame patterns; (d) timing between detected frame patterns; (e) sequence in which frames are transmitted; (f) timing distribution within frame patterns; (g) timing between different frame types; (h) timing between same frame types; (i) timing between interframe spaces; and, (j) any combination thereof.

According to another embodiment of the invention, the method as described above, wherein at least one evaluated frame originates from at least one of: (a) the ECU; (b) at least one first the frame originates from the ECU and at least a second the frame originates from at least a second ECU; and, (c) any combination thereof.

According to another embodiment of the invention, the method as described above, wherein the relation characteristic comprising at least one of: (a) timing between sending at least one frame and receiving at least one response frame; (b) type(s) of the response frame received and the type(s) of the sent frame; (c) number of the sent frames in order to receive at least one response frame; (d) number of the response frames received in following at least one sent frame; (e) the response frame and the sent frame content; (f)

sequence of the response frames following at least one sent frame; (g) sequence of the sent frames in order to receive at least one response frame; (h) the sent frame and the response frame at least one characteristic selected from: time based characteristic, electrical based characteristic, physical CAN BUS based characteristic; (i) the sent frame and the response frame one or more time evaluated characteristic selected from: (i) timing between consecutive frames; (ii) timing between a frame and a last similar frame; (iii) timing between predefined frame patterns; (iv) timing between learned patterns; (v) sequence in which frames are transmitted; and, (j) any combination thereof.

According to another embodiment of the invention, the method as described above, additionally comprising the steps of: (a) providing the system further comprising one or more comparator unit(s) in communication with the characterization module and the mapping database, and one or more Identification module(s) in communication with the comparator unit; (b) preforming at least one of: (i) comparing one or more the characteristics of at least one monitored frame, against at least one of: (1) one or more the characteristics of at least one response frame; (2) one or more the ECU originating communication characteristic; (3) one or more the probability matrix provided characteristic; (ii) comparing at least one relation characteristics between at least one first frame and at least one second frame against: (1) one or more relation characteristic between at least one sent frame and at least one response frame; (2) one or more the probability matrix provided relation characteristic; and, (iii) any combination thereof; for detecting at least one anomaly. (b) receiving by means of the identification module at least one anomaly from the comparator unit and identify at least one ECU originating the attack according to the characteristic difference.

According to another embodiment of the invention, the method as described above, additionally comprising the step of providing comparing by means of the comparator one or more the characteristic of at least one frame to at least one characteristic of a selected from: (a) at least one response frame induced by the mapping module; (b) at least one response frame logged in the mapping database as being induced by a similar frame as the compared frame; (c) at least one sent frame and one response frame logged in the mapping database when the sent frame is similar to the compared message frame; (d) at least one monitored frame not induced by the mapping module; and, (e) any combination thereof; in order to detect at least one anomaly.

According to another embodiment of the invention, the method as described above, additionally comprising the step of comparing by means of the comparator against one or more the characteristics selected from: (a) learned over time; (b) predefined; (c) updated in real-time; (d) updated remotely; and, (e) any combination thereof.

According to another embodiment of the invention, the method as described above, additionally comprising the step of the identification module forwarding at least one anomaly and/or the identified attack originator to at least one selected from: (a) a driver of a vehicle comprising at least a portion of the CAN bus by means of a dedicated human machine interface; (b) one or more the ECU; (c) one or more third party system located in the vehicle comprising at least a portion of the CAN bus; (d) one or more external system; and, (e) any combination thereof.

According to another embodiment of the invention, the method as described above, additionally comprising the step of sending by means of the sending module at least one frame selected from: (a) monitored communication frame, (b) modified communication frame; (c) predefined communication frame; (d) error communication frame; (e) data communication frame; (f) overload communication frame; (g) remote communication frame; and, (h) any combination thereof; in order to induce at least one response frame.

Figure 5:
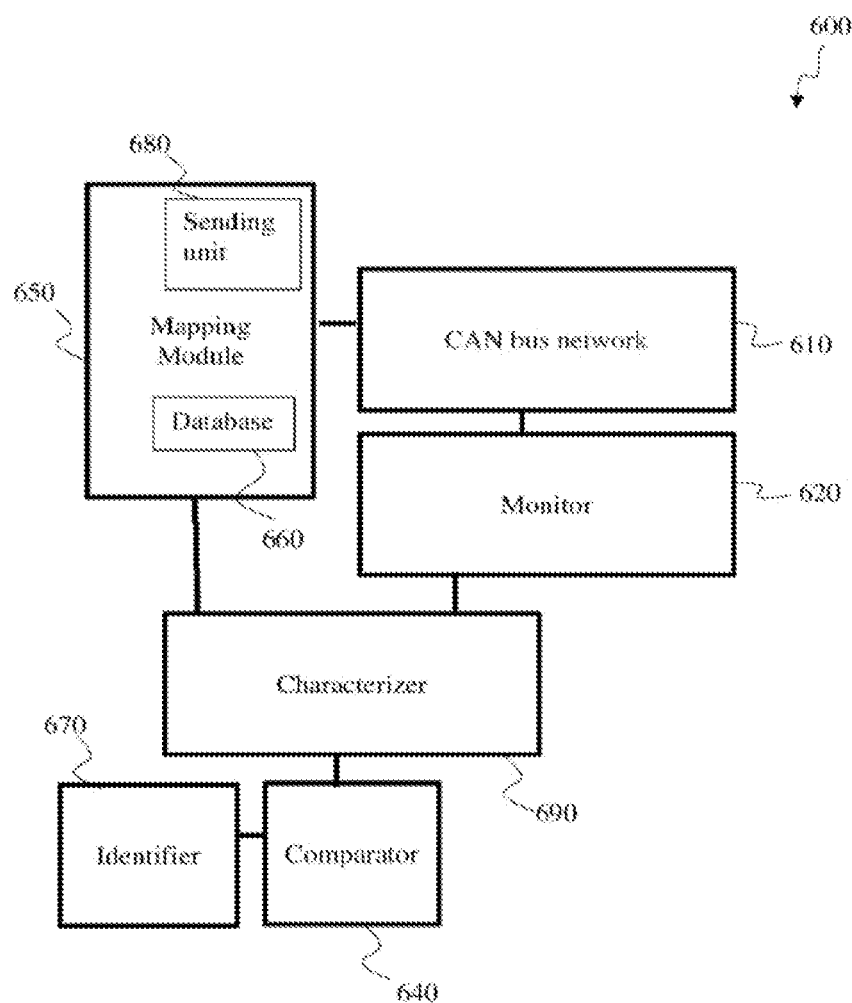
FIG. 5 is a schematic diagram of an embodiment of a system for CAN bus communication mapping for CAN bus attack identification.

Reference is now made to FIG. 5, schematically representing in an out of scale manner an embodiment of the invention. A vehicle CAN bus network mapping system (600), useful for detecting an attack originator, comprising: (a) one or more CAN Bus Monitor(s), (CBM) (620), configured to monitor the CAN bus communication (610) comprising at least one first frame and at least one second frame to and/or from at least one Electronic Control Unit, (ECU); (b) one or more mapping module (650) in communication with the bus communication network, the mapping module comprising: (i) at least one sending unit (680) configured to send at least one frame into the CAN bus network for inducing at least one response frame, (ii) at least one message relation database (660) comprising frame relation characteristics between at least one sent frame and one response frame; (c) one or more characterization module(s) (690) in communication with the CBM, and the mapping module (650) configured to provide one or more characteristic for at least one monitored message, one or more relation characteristic for the sent frame and at least one response frame and one or more the characteristic for each the ECU communication; (d) one or more comparator unit(s) (640) in communication with the characterization module (690), and the mapping module (650), the comparator (640) is configured to compare one or more the relation characteristics of at least one first monitored frame and at least one second the frame against at least one relation characteristics provided by the mapping module and/or compare one or more characteristic of at least one first frame to at least one second frame to detect at least one anomaly; (e) one or more Identification module(s) (670) in communication with the Comparator, and the mapping module, configured to identify at least one ECU originating an attack on the CAN bus; wherein the Comparator unit is configured to generate at least one event for one or more detected anomaly comprising at least one of: at least one characteristic difference and forward the event to the identification module configured to identify at least one ECU originating the attack according to the characteristic difference.

The invention claimed is:

1. A vehicle Controller Area Network (CAN) bus network mapping system, comprising:
   a. one or more CAN Bus Monitors (CBM) configured to monitor a CAN bus communication comprising one or more frames to at least one Electronic Control Unit (ECU), or one or more frames from at least one ECU, or both;
   b. one or more sending units configured to send frames into a CAN bus network for inducing response frames;
   c. one or more characterization modules in communication with said CBMs, configured to provide at least one characteristic for said monitored CAN Bus communication, or frame relation characteristics generated by said characterization modules between sent frames and response frames, or both;
   d. one or more mapping databases operatively in communication with said sending units and said characterization modules; said mapping databases comprising monitored response frame characteristics of responding ECUs, or frame relation characteristics generated by said characterization modules between sent frames and response frames, or both; and e. at least one processor in communication with a non-transient computer readable medium (CRM), said at least one processor to execute a set of operations received from said CRM, said set of operations including:
  i. sending at least one frame by means of said sending units in order to induce at least one response frame;
  ii. monitoring said CAN bus communication by means of said CBMs;
  iii. characterizing, by means of said characterization modules, said at least one response frame, or a relation between said at least one sent frame and said at least one response frame, or both; and
  iv. logging, into said mapping databases, said at least one sent frame, or one or more response frame characteristics, or one or more frame relation characteristics between said at least one sent frame and said at least one response frame, or a combination thereof;

wherein said processor is configured to generate one or more probability matrices comprising at least one of: possible response frames, possible response frame characteristics, possible characteristics of ECU originated CAN Bus communications, possible frame relation characteristics, and any combination thereof, for at least one sent frame according to said mapping databases.

2. The mapping system according to claim 1, wherein said at least one ECU is selected from:
  a. an On-board ECU installed during a vehicle manufacturing process;
  b. an ECU installed post vehicle assembly by a manufacturer;
  c. an ECU physically added to the CAN BUS by an attacker; and
  d. any combination thereof.

3. The mapping system according to claim 1, wherein said at least one ECU is at least one of:
  a. engine management ECU;
  b. transmission management ECU;
  c. safety related ECU;
  d. telematics control unit (TCU);
  e. brake control ECU;
  f. central timing module (CTM) ECU;
  g. passenger comfort related ECU;
  h. human-machine interface (HMI) ECU;
  i. battery management ECU;
  j. driver assistance ECU;
  k. chassis electronics ECU;
  l. infotainment ECU; and
  m. any combination thereof.

4. The mapping system according to claim 1, wherein said characterization modules are configured to receive monitored CAN bus communications from more than one CBM.

5. The mapping system according to claim 1, wherein said characterization modules are configured to generate at least one frame characteristic selected from:
  a. time based characteristic;
  b. electrical based characteristic;
  c. noise based characteristic;
  d. physical CAN bus characteristic; and
  e. any combination thereof.

6. The mapping system according to claim 5, wherein said characterization modules are further configured to evaluate time based characteristics selected from:
  a. timing between consecutive frames;
  b. timing between a frame and the last similar frame;
  c. timing between predefined frame patterns;
  d. timing between detected frame patterns;
  e. sequence in which frames are transmitted;
  f. timing distribution within frame patterns;
  g. timing between different frame types;
  h. timing between same frame types;
  i. timing between inter-frame spaces; and
  j. any combination thereof.

7. The mapping system according to claim 6, wherein at least one frame of said evaluation originates from at least one of:
  a. said at least one ECU,
  b. at least one first frame of said evaluation originating from said at least one ECU and at least one second frame of said evaluation originating from at least one additional ECU; and
  c. any combination thereof.

8. The mapping system according to claim 1, wherein said one or more frame relation characteristics comprise at least one of:
  a. a timing between sending at least one frame and receiving at least one response frame;
  b. a type of response frame received and a type of sent frame;
  c. a number of frames sent in order to receive at least one response frame;
  d. a number of response frames received following at least one sent frame;
  e. a response frame content and a sent frame content;
  f. a sequence of response frames following at least one sent frame;
  g. a sequence of frames sent in order to receive at least one response frame;
  h. a frame characteristic selected from: a time based characteristic, an electrical based characteristic, and physical CAN BUS based characteristic;
  i. one or more time evaluated characteristics selected from:
    i. timing between consecutive frames;
    ii. timing between a frame and a last similar frame;
    iii. timing between predefined frame patterns;
    iv. timing between learned patterns; and
    v. sequence in which frames are transmitted; and
  j. any combination thereof.

9. The mapping system according to claim 1, wherein said system further comprises one or more comparator units in communication with said characterization modules and said mapping databases, and one or more identification modules in communication with said comparator units, said comparator units being configured to perform at least one of:
  a. compare one or more characteristics of at least one monitored frame, against at least one of:
    i. one or more characteristics of said at least one response frame;
    ii. one or more ECU originated CAN bus communication characteristics; and
    iii. one or more said generated probability matrix characteristics;
  b. compare at least one frame relation characteristic between at least one first frame and at least one second frame against:
    i. one or more frame relation characteristics between said at least one sent frame and said at least one response frame; and,
    ii. one or more said generated probability matrix frame relation characteristics; and
  c. any combination thereof;

in order to detect at least one anomaly, said identification modules being configured to receive said at least one anomaly from said comparator units and to identify at least one ECU originated attack according to one of the comparisons.

10. The mapping system according to claim 9, wherein said comparator units are configured to compare one or more characteristics of at least one frame to at least one characteristic selected from:
 a. at least one response frame induced by a mapping module;
 b. at least one response frame logged in said mapping databases as being induced by a similar frame as a compared frame;
 c. at least one sent frame and a response frame logged in said mapping databases when the at least one sent frame that is logged is similar to a compared frame;
 d. at least one monitored frame not induced a mapping module; and
 e. any combination thereof;
in order to detect said at least one anomaly.

11. The mapping system according to claim 9, wherein said comparator units compare against one or more characteristics selected from:
 a. learned over time;
 b. predefined;
 c. updated in real-time;
 d. updated remotely; and
 e. any combination thereof.

12. The mapping system according to claim 9, wherein said identification modules are further configured to forward at least one event, or an identified attack originator, or both to at least one of:
 a. a driver of a vehicle comprising at least a portion of said CAN bus network by means of a dedicated human machine interface;
 b. one or more ECUs;
 c. one or more third party systems located in a vehicle comprising at least a portion of said CAN bus network;
 d. one or more external systems; and
 e. any combination thereof.

13. The mapping system according to claim 1, wherein said sending units are configured to send frames selected from:
 a. monitored communication frame,
 b. modified communication frame;
 c. predefined communication frame;
 d. error communication frame;
 e. data communication frame;
 f. overload communication frame;
 g. remote communication frame; and
 h. any combination thereof,
in order to induce response frames.

14. A method for mapping a vehicle Controller Area Network (CAN) bus network, comprising the steps of:
 a. providing:
  i. one or more CAN Bus Monitors (CBM) configured to monitor a CAN bus communication comprising one or more frames to at least one Electronic Control Unit (ECU), or one or more frames from at least one ECU, or both;
  ii. one or more sending units configured to send frames into a CAN bus network for inducing response frames;
  iii. one or more characterization modules in communication with said CBMs, configured to provide at least one characteristic for said monitored CAN Bus communication, or frame relation characteristics generated by said characterization modules between sent frames and response frames, or both; and
  iv. at least one mapping module comprising a mapping database, operatively in communication with said sending units and said characterization modules; said mapping database comprising monitored response frame characteristics of responding ECUs, or frame relation characteristics generated by said characterization modules between sent frames and response frames, or both;
 b. sending at least one frame by means of said sending units;
 c. monitoring said CAN bus communication by means of said CBMs;
 d. characterizing, by means of said characterization modules, at least one response frame, or a relation between said at least one sent frame and at least one response frame, or both; and
 e. logging, into said mapping data base, said at least one sent frame, or one or more response frame characteristics, or one or more frame relation characteristics between said at least one sent frame and said at least one response frame, or a combination thereof;
wherein said method additionally comprises the step of generating at least one probability matrix of: possible response frames, or said response frame characteristics, or both, by means of said mapping module, for said at least one sent frame according to said mapping database.

15. The method of claim 14, additionally comprising the step of providing said at least one ECU from at least one of:
 a. an On-board ECU installed during a vehicle manufacturing process;
 b. an ECU installed post vehicle assembly by a manufacturer;
 c. an ECU physically added to the CAN BUS by an attacker; and
 d. any combination thereof.

16. The method of claim 14, additionally comprising the step of providing said at least one ECU from at least one of:
 a. engine management ECU;
 b. transmission management ECU;
 c. safety related ECU;
 d. telematics control unit (TCU);
 e. brake control ECU;
 f. central timing module (CTM) ECU;
 g. passenger comfort related ECU;
 h. human-machine interface (HMI) ECU;
 i. battery management ECU;
 j. driver assistance ECU;
 k. chassis electronics ECU
 l. infotainment ECU; and
 m. any combination thereof.

17. The method of claim 14, additionally comprising the step of said characterization modules receiving monitored CAN bus communications from more than one CBM.

18. The method of claim 14, additionally comprising the step of generating, by means of said characterization modules, at least one frame characteristic selected from:
 a. time based characteristic;
 b. electrical based characteristic;
 c. noise based characteristic;
 d. physical CAN bus characteristic; and
 e. any combination thereof.

19. The method of claim 18, additionally comprising the step of evaluating, by means of said characterization modules, time based characteristics selected from:
   a. timing between consecutive frames;
   b. timing between a frame and the last similar frame;
   c. timing between predefined frame patterns;
   d. timing between detected frame patterns;
   e. sequence in which frames are transmitted;
   f. timing distribution within frame patterns;
   g. timing between different frame types;
   h. timing between same frame types;
   i. timing between inter-frame spaces; and
   j. any combination thereof.

20. The method of claim 19, wherein at least one frame of said evaluation originates from at least one of:
   a. said at least one ECU,
   b. at least one first frame of said evaluation originating from said at least one ECU and at least one second frame of said evaluation originating from at least one additional ECU and,
   c. any combination thereof.

21. The method of claim 14, wherein said one or more frame relation characteristics comprise at least one of:
   a. a timing between sending at least one said frame and receiving at least one response frame;
   b. a type of response frame received and a type of sent frame;
   c. a number of frames sent in order to receive at least one response frame;
   d. a number of response frames received following at least one sent frame;
   e. a response frame content and a sent frame content;
   f. a sequence of response frames following at least one sent frame;
   g. a sequence of frames sent in order to receive at least one response frame;
   h. a frame characteristic selected from: a time based characteristic, an electrical based characteristic, and physical CAN BUS based characteristic;
   i. one or more time evaluated characteristics selected from:
      i. timing between consecutive frames;
      ii. timing between a frame and a last similar frame;
      iii. timing between predefined frame patterns;
      iv. timing between learned patterns; and
      v. sequence in which frames are transmitted; and
   j. any combination thereof.

22. The method of claim 14, additionally comprising the steps of:
   a. providing one or more comparator units in communication with said characterization modules and said mapping database, and one or more identification modules in communication with said comparator units;
   b. preforming at least one of:
      i. comparing one or more characteristics of at least one monitored frame, against at least one of:
         (1) one or more characteristics of said at least one response frame;
         (2) one or more ECU originated CAN bus communication characteristics; and,
         (3) one or more said generated probability matrix characteristics;
      ii. comparing at least one frame relation characteristic between at least one first frame and at least one second frame against:
         (1) one or more frame relation characteristics between said at least one sent frame and said at least one response frame; and
         (2) one or more said generated probability matrix frame relation characteristics; and
      (iii) any combination thereof; for detecting at least one anomaly; and
   c. receiving by means of said identification module said at least one anomaly from said comparator units and identifying at least one ECU originated attack according to one of the comparisons.

23. The method of claim 22, additionally comprising the step of comparing by means of said comparator units one or more characteristics of at least one frame to at least one characteristic selected from:
   a. at least one response frame induced by a mapping module;
   b. at least one response frame logged in said mapping databases as being induced by a similar frame as a compared frame;
   c. at least one sent frame and a response frame logged in said mapping databases when the at least one sent frame that is logged is similar to a compared frame;
   d. at least one monitored frame not induced a mapping module; and
   e. any combination thereof;
   in order to detect said at least one anomaly.

24. The method of claim 22, additionally comprising the step of comparing by means of said comparator units against one or more characteristics selected from:
   a. learned over time;
   b. predefined;
   c. updated in real-time;
   d. updated remotely; and
   e. any combination thereof.

25. The method of claim 22, additionally comprising the step of said identification modules forwarding said at least one anomaly, or an identified attack originator, or both to at least one of:
   a. a driver of a vehicle comprising at least a portion of said CAN bus network by means of a dedicated human machine interface;
   b. one or more ECUs;
   c. one or more third party systems located in a vehicle comprising at least a portion of said CAN bus network;
   d. one or more external systems; and
   e. any combination thereof.

26. The method of claim 14, additionally comprising the step of sending, by means of said sending modules, frames selected from:
   a. monitored communication frame,
   b. modified communication frame;
   c. predefined communication frame;
   d. error communication frame;
   e. data communication frame;
   f. overload communication frame;
   g. remote communication frame; and
   h. any combination thereof,
   in order to induce response frames.

* * * * *